United States Patent
Proctor, Jr.

(10) Patent No.: US 8,134,980 B2
(45) Date of Patent: Mar. 13, 2012

(54) TRANSMITTAL OF HEARTBEAT SIGNAL AT A LOWER LEVEL THAN HEARTBEAT REQUEST

(75) Inventor: James A. Proctor, Jr., Melbourne Beach, FL (US)

(73) Assignee: IPR Licensing, Inc., Wilmington, DE (US)

( * ) Notice: Subject to any disclaimer, the term of this patent is extended or adjusted under 35 U.S.C. 154(b) by 619 days.

(21) Appl. No.: 11/805,013

(22) Filed: May 22, 2007

(65) Prior Publication Data

US 2007/0223426 A1 Sep. 27, 2007

Related U.S. Application Data

(63) Continuation of application No. 10/171,080, filed on Jun. 12, 2002, now Pat. No. 7,221,664, which is a continuation-in-part of application No. 09/997,621, filed on Nov. 29, 2001, now Pat. No. 6,678,260, and a continuation-in-part of application No. 09/775,305, filed on Feb. 1, 2001, now Pat. No. 7,079,523, which is a continuation of application No. 09/730,376, filed on Dec. 5, 2000, now Pat. No. 6,707,804, which is a continuation of application No. 09/088,413, filed on Jun. 1, 1998, now Pat. No. 6,222,832, which is a continuation-in-part of application No. 08/992,760, filed on Dec. 17, 1997, now Pat. No. 6,081,536, which is a continuation-in-part of application No. 08/992,759, filed on Dec. 17, 1997, now Pat. No. 6,151,332, which is a continuation-in-part of application No. 09/030,049, filed on Feb. 24, 1998, now Pat. No. 6,236,647.

(60) Provisional application No. 60/378,697, filed on May 7, 2002, provisional application No. 60/297,925, filed on Jun. 13, 2001.

(51) Int. Cl.
*H04L 12/28* (2006.01)
*H04B 7/216* (2006.01)
*H04B 7/00* (2006.01)

(52) U.S. Cl. ........ 370/335; 252/342; 252/352; 375/137; 455/445

(58) Field of Classification Search .......... 370/200–522; 375/130–272; 455/409–445, 509; 709/203–224
See application file for complete search history.

(56) References Cited

U.S. PATENT DOCUMENTS 3,560,978 A 2/1971 Himmel et al.
(Continued)

FOREIGN PATENT DOCUMENTS

DE 2812575 9/1979
(Continued)

OTHER PUBLICATIONS

Azad et al., Multirate Spread Spectrum Direct Sequence CDMA Techniques, 1994, The Institute of Electrical Engineers.

(Continued)

*Primary Examiner* — Afsar M. Qureshi
(74) *Attorney, Agent, or Firm* — Volpe and Koenig, P.C.

(57) ABSTRACT

A communication system, such as a wireless CDMA system, detects markers with fewer errors by having field units transmit the markers at different power levels (e.g., 9 dB for one marker and 11 dB for another marker). The difference in power levels of the markers allows the base station to identify the request markers using alternative criteria with a low probability of error, where the alternative criteria may include comparing the markers to respective energy level thresholds, monitoring occupancy of time slots, occupancy of mutually exclusive code channels, or combinations thereof. For example, in one particular embodiment, a request marker, which is generally a high priority marker, is transmitted with higher power, which improves the probability of detection and reduces the probability of false detection of the request marker.

19 Claims, 6 Drawing Sheets

U.S. PATENT DOCUMENTS

| | | |
|---|---|---|
| 3,725,938 A | 4/1973 | Black et al. |
| 3,742,498 A | 6/1973 | Dunn |
| 3,846,799 A | 11/1974 | Guegen |
| 3,950,753 A | 4/1976 | Chisholm |
| 4,021,813 A | 5/1977 | Black et al. |
| 4,099,184 A | 7/1978 | Rapshys |
| 4,107,469 A | 8/1978 | Jenkins |
| 4,170,766 A | 10/1979 | Pridham et al. |
| 4,260,994 A | 4/1981 | Parker |
| 4,290,071 A | 9/1981 | Fenwick |
| 4,387,378 A | 6/1983 | Henderson |
| 4,448,155 A | 5/1984 | Hillebrand et al. |
| 4,488,155 A | 12/1984 | Wu |
| 4,577,316 A | 3/1986 | Schiff |
| 4,599,733 A | 7/1986 | Gutleber |
| 4,625,308 A | 11/1986 | Kim et al. |
| 4,631,546 A | 12/1986 | Dumas et al. |
| 4,642,806 A | 2/1987 | Hewitt et al. |
| 4,675,863 A | 6/1987 | Paneth et al. |
| 4,700,197 A | 10/1987 | Milne |
| 4,817,089 A | 3/1989 | Paneth et al. |
| 4,841,526 A | 6/1989 | Wilson et al. |
| 4,862,453 A | 8/1989 | West et al. |
| 4,866,709 A | 9/1989 | West et al. |
| 4,887,266 A | 12/1989 | Neve et al. |
| 4,912,705 A | 3/1990 | Paneth et al. |
| 4,949,395 A | 8/1990 | Rydbeck |
| 4,954,950 A | 9/1990 | Freeman et al. |
| 5,022,024 A | 6/1991 | Paneth et al. |
| 5,027,125 A | 6/1991 | Tang |
| 5,027,348 A | 6/1991 | Curry, Jr. |
| 5,027,400 A | 6/1991 | Baji et al. |
| 5,038,149 A | 8/1991 | Aubry et al. |
| 5,056,109 A | 10/1991 | Gilhousen et al. |
| 5,068,916 A | 11/1991 | Harrison et al. |
| 5,101,416 A | 3/1992 | Fenton et al. |
| 5,103,459 A | 4/1992 | Gilhousen et al. |
| 5,114,375 A | 5/1992 | Wellhausen et al. |
| 5,115,309 A | 5/1992 | Hang |
| 5,117,236 A | 5/1992 | Chang et al. |
| 5,124,981 A | 6/1992 | Golding |
| 5,130,983 A | 7/1992 | Heffner, III |
| 5,166,929 A | 11/1992 | Lo |
| 5,226,044 A | 7/1993 | Gupta et al. |
| 5,235,343 A | 8/1993 | Audren et al. |
| 5,257,283 A | 10/1993 | Gilhousen et al. |
| 5,267,262 A | 11/1993 | Wheatley, III |
| 5,268,900 A | 12/1993 | Hluchyj et al. |
| 5,280,472 A | 1/1994 | Gilhousen et al. |
| 5,282,222 A | 1/1994 | Fattouche et al. |
| 5,293,172 A | 3/1994 | Lamberty et al. |
| 5,294,939 A | 3/1994 | Sanford et al. |
| 5,303,240 A | 4/1994 | Borras et al. |
| 5,325,394 A | 6/1994 | Bruckert |
| 5,325,419 A | 6/1994 | Connolly et al. |
| 5,337,316 A | 8/1994 | Weiss et al. |
| 5,339,316 A | 8/1994 | Diepstraten |
| 5,353,332 A | 10/1994 | Raith et al. |
| 5,355,374 A | 10/1994 | Hester et al. |
| 5,373,502 A | 12/1994 | Turban |
| 5,375,124 A | 12/1994 | D'Ambrogio et al. |
| 5,377,192 A | 12/1994 | Gooding et al. |
| 5,388,102 A | 2/1995 | Griffith et al. |
| 5,394,473 A | 2/1995 | Davidson |
| 5,412,429 A | 5/1995 | Glover |
| 5,414,728 A | 5/1995 | Zehavi |
| 5,422,887 A | 6/1995 | Diepstraten et al. |
| 5,430,452 A | 7/1995 | DuBois |
| 5,437,055 A | 7/1995 | Wheatley, III |
| 5,442,625 A | 8/1995 | Gitlin et al. |
| 5,446,727 A | 8/1995 | Bruckert et al. |
| 5,463,629 A | 10/1995 | Ko |
| 5,471,463 A | 11/1995 | Hulbert |
| 5,479,176 A | 12/1995 | Zavrel, Jr. |
| 5,481,533 A | 1/1996 | Honig et al. |
| 5,487,180 A | 1/1996 | Ohtake |
| 5,490,136 A | 2/1996 | Sereno et al. |
| 5,493,569 A | 2/1996 | Buchholz et al. |
| 5,502,447 A | 3/1996 | Kumpfbeck et al. |
| 5,511,068 A | 4/1996 | Sato |
| 5,537,397 A | 7/1996 | Abramson |
| 5,537,414 A | 7/1996 | Takiyasu et al. |
| 5,550,828 A | 8/1996 | Gries et al. |
| 5,559,789 A | 9/1996 | Nakano et al. |
| 5,577,022 A | 11/1996 | Padovani et al. |
| 5,581,575 A | 12/1996 | Zehavi et al. |
| 5,585,850 A | 12/1996 | Schwaller |
| 5,586,119 A | 12/1996 | Scribano et al. |
| 5,590,409 A | 12/1996 | Sawahashi et al. |
| 5,592,178 A | 1/1997 | Chang et al. |
| 5,592,468 A | 1/1997 | Sato |
| 5,592,470 A | 1/1997 | Rudrapatna et al. |
| 5,592,471 A | 1/1997 | Briskman |
| 5,598,416 A | 1/1997 | Yamada et al. |
| 5,598,417 A | 1/1997 | Crisler et al. |
| 5,604,730 A | 2/1997 | Tiedemann, Jr. |
| 5,606,580 A | 2/1997 | Mourot et al. |
| 5,617,102 A | 4/1997 | Prater |
| 5,617,423 A | 4/1997 | Li et al. |
| 5,619,492 A | 4/1997 | Press et al. |
| 5,619,524 A | 4/1997 | Ling et al. |
| 5,621,752 A | 4/1997 | Antonio et al. |
| 5,634,199 A | 5/1997 | Gerlach et al. |
| 5,642,348 A | 6/1997 | Barzegar et al. |
| 5,642,377 A | 6/1997 | Chung et al. |
| 5,652,764 A | 7/1997 | Kanzaki et al. |
| 5,655,001 A | 8/1997 | Cline et al. |
| 5,657,326 A | 8/1997 | Burns et al. |
| 5,657,358 A | 8/1997 | Panech et al. |
| 5,663,958 A | 9/1997 | Ward |
| 5,663,990 A | 9/1997 | Bolgiano et al. |
| 5,673,259 A | 9/1997 | Quick, Jr. |
| 5,680,142 A | 10/1997 | Smith et al. |
| 5,684,794 A | 11/1997 | Lopez et al. |
| 5,687,194 A | 11/1997 | Paneth et al. |
| 5,689,502 A | 11/1997 | Scott |
| 5,697,059 A | 12/1997 | Carney |
| 5,699,364 A | 12/1997 | Sato et al. |
| 5,708,656 A | 1/1998 | Noneman et al. |
| 5,712,869 A | 1/1998 | Lee et al. |
| 5,715,236 A | 2/1998 | Gilhousen et al. |
| 5,726,981 A | 3/1998 | Ylitervo et al. |
| 5,734,646 A | 3/1998 | I et al. |
| 5,739,784 A | 4/1998 | Jan et al. |
| 5,742,592 A | 4/1998 | Scholefield et al. |
| 5,745,484 A | 4/1998 | Scott |
| 5,758,288 A | 5/1998 | Dunn et al. |
| 5,764,648 A | 6/1998 | Yamane et al. |
| 5,767,807 A | 6/1998 | Pritchett |
| 5,781,542 A | 7/1998 | Tanaka et al. |
| 5,781,543 A | 7/1998 | Ault et al. |
| 5,784,406 A | 7/1998 | DeJaco et al. |
| 5,790,549 A | 8/1998 | Dent |
| 5,790,551 A | 8/1998 | Chan |
| 5,793,744 A | 8/1998 | Kanerva et al. |
| 5,802,046 A | 9/1998 | Scott |
| 5,802,465 A | 9/1998 | Hamalainen et al. |
| 5,805,994 A | 9/1998 | Perrault et al. |
| 5,812,131 A | 9/1998 | Bertram |
| 5,825,807 A | 10/1998 | Kumar |
| 5,828,659 A | 10/1998 | Teder et al. |
| 5,828,662 A | 10/1998 | Jalali et al. |
| 5,838,720 A | 11/1998 | Morelli |
| 5,841,768 A | 11/1998 | Ozluturk et al. |
| 5,844,894 A | 12/1998 | Dent |
| 5,845,211 A | 12/1998 | Roach |
| 5,854,786 A | 12/1998 | Henderson et al. |
| 5,856,971 A | 1/1999 | Gitlin et al. |
| 5,859,840 A | 1/1999 | Tiedemann, Jr. et al. |
| 5,859,879 A | 1/1999 | Bolgiano et al. |
| 5,862,476 A | 1/1999 | Hasegawa et al. |
| 5,867,527 A | 2/1999 | Ziv et al. |
| 5,872,786 A | 2/1999 | Shobatake |
| 5,873,043 A | 2/1999 | Comer |
| 5,881,060 A | 3/1999 | Morrow et al. |
| 5,881,368 A | 3/1999 | Grob et al. |
| 5,884,196 A | 3/1999 | Lekven et al. |

| | | | | | | |
|---|---|---|---|---|---|---|
| 5,892,774 A | 4/1999 | Zehavi et al. | | 6,169,731 B1 | 1/2001 | Stewart et al. |
| 5,892,793 A | 4/1999 | Gibson | | 6,169,759 B1 | 1/2001 | Kanterakis et al. |
| 5,893,035 A | 4/1999 | Chen | | 6,185,184 B1 | 2/2001 | Mattaway et al. |
| 5,894,473 A | 4/1999 | Dent | | 6,185,266 B1 | 2/2001 | Kuchi et al. |
| 5,896,374 A | 4/1999 | Okumura et al. | | 6,188,678 B1 | 2/2001 | Prescott |
| 5,896,376 A | 4/1999 | Alperovich et al. | | 6,188,903 B1 | 2/2001 | Gardner et al. |
| 5,898,929 A | 4/1999 | Haartsen | | 6,195,362 B1 | 2/2001 | Darcie et al. |
| 5,903,834 A | 5/1999 | Wallstedt et al. | | 6,198,723 B1 | 3/2001 | Parruck et al. |
| 5,905,473 A | 5/1999 | Taenzer | | 6,201,966 B1 | 3/2001 | Rinne et al. |
| 5,910,944 A | 6/1999 | Callicotte et al. | | 6,208,871 B1 | 3/2001 | Hall et al. |
| 5,910,945 A | 6/1999 | Garrison et al. | | 6,212,175 B1 | 4/2001 | Harsch |
| 5,914,950 A | 6/1999 | Tiedemann, Jr. et al. | | 6,212,220 B1 | 4/2001 | Proctor, Jr. |
| 5,915,216 A | 6/1999 | Lysejko | | 6,214,342 B1 | 4/2001 | Alberici et al. |
| 5,918,170 A | 6/1999 | Oksanen et al. | | 6,215,798 B1 | 4/2001 | Carneheim et al. |
| 5,923,650 A | 7/1999 | Chen et al. | | 6,219,342 B1 | 4/2001 | Rege |
| 5,926,500 A | 7/1999 | Odenwalder | | 6,222,828 B1 | 4/2001 | Ohlson et al. |
| 5,930,230 A | 7/1999 | Odenwalder et al. | | 6,222,832 B1 | 4/2001 | Proctor |
| 5,933,781 A | 8/1999 | Willenegger et al. | | 6,222,873 B1 | 4/2001 | Bang et al. |
| 5,943,362 A | 8/1999 | Saito | | 6,226,279 B1 | 5/2001 | Hansson et al. |
| 5,946,356 A | 8/1999 | Felix et al. | | 6,226,527 B1 | 5/2001 | Dalsgaard et al. |
| 5,949,814 A | 9/1999 | Odenwalder et al. | | 6,233,439 B1 | 5/2001 | Jalali |
| 5,950,131 A | 9/1999 | Vilmur | | 6,236,646 B1 | 5/2001 | Beming et al. |
| 5,956,332 A | 9/1999 | Rasanen et al. | | 6,236,647 B1 | 5/2001 | Amalfitano |
| 5,959,980 A | 9/1999 | Scott | | 6,236,674 B1 | 5/2001 | Morelli et al. |
| 5,960,361 A | 9/1999 | Chen | | 6,243,372 B1 | 6/2001 | Petch et al. |
| 5,963,559 A | 10/1999 | Ohki | | 6,246,673 B1 | 6/2001 | Tiedemann, Jr. et al. |
| 5,966,374 A | 10/1999 | Rasanen | | 6,246,715 B1 | 6/2001 | Park et al. |
| 5,974,036 A | 10/1999 | Acharya et al. | | RE37,301 E | 7/2001 | Lo |
| 5,982,760 A | 11/1999 | Chen | | 6,256,509 B1 | 7/2001 | Tanaka et al. |
| 5,990,806 A | 11/1999 | Mock et al. | | 6,259,683 B1 | 7/2001 | Sekine et al. |
| 5,991,279 A | 11/1999 | Haugli et al. | | 6,262,980 B1 | 7/2001 | Leung et al. |
| 5,991,284 A | 11/1999 | Willenegger et al. | | 6,263,013 B1 | 7/2001 | Hendrickson |
| 5,991,618 A | 11/1999 | Hall | | 6,269,075 B1 | 7/2001 | Tran |
| 6,001,800 A | 12/1999 | Mehta et al. | | 6,269,088 B1 | 7/2001 | Masui et al. |
| 6,002,690 A | 12/1999 | Takayama et al. | | 6,272,168 B1 | 8/2001 | Lomp et al. |
| 6,005,852 A | 12/1999 | Kokko et al. | | 6,272,354 B1 | 8/2001 | Saaroi |
| 6,005,855 A | 12/1999 | Zehavi et al. | | 6,275,478 B1 | 8/2001 | Tiedemann, Jr. |
| 6,009,106 A | 12/1999 | Rustad et al. | | 6,278,701 B1 | 8/2001 | Ayyagari et al. |
| 6,011,800 A | 1/2000 | Nadgauda et al. | | 6,285,665 B1 | 9/2001 | Chuah |
| 6,016,312 A | 1/2000 | Storn et al. | | 6,292,474 B1 | 9/2001 | Ali et al. |
| 6,028,868 A | 2/2000 | Yeung et al. | | 6,301,286 B1 | 10/2001 | Kanterakis et al. |
| 6,031,827 A | 2/2000 | Rikkinen et al. | | 6,301,291 B1 | 10/2001 | Rouphael et al. |
| 6,031,832 A | 2/2000 | Turina | | 6,304,215 B1 | 10/2001 | Proctor, Jr. et al. |
| 6,034,638 A | 3/2000 | Thiel et al. | | 6,307,840 B1 | 10/2001 | Wheatley, III et al. |
| 6,037,905 A | 3/2000 | Koscica et al. | | 6,310,859 B1 | 10/2001 | Morita et al. |
| 6,038,450 A | 3/2000 | Brink et al. | | 6,314,300 B1 | 11/2001 | Nakashima et al. |
| 6,049,535 A | 4/2000 | Ozluturk | | 6,317,092 B1 | 11/2001 | De Schweinitz et al. |
| 6,049,538 A | 4/2000 | Scott | | 6,320,851 B1 | 11/2001 | Kim et al. |
| 6,052,385 A | 4/2000 | Kanerva et al. | | 6,332,008 B1 | 12/2001 | Giallorenzi et al. |
| 6,058,338 A | 5/2000 | Agashe et al. | | 6,337,668 B1 | 1/2002 | Ito et al. |
| 6,064,678 A | 5/2000 | Sindhushayana et al. | | 6,339,612 B1 | 1/2002 | Stewart et al. |
| 6,069,880 A | 5/2000 | Owen et al. | | 6,353,412 B1 | 3/2002 | Soliman |
| 6,069,883 A | 5/2000 | Ejzak et al. | | 6,353,645 B1 | 3/2002 | Solve et al. |
| 6,070,071 A | 5/2000 | Chavez et al. | | 6,356,538 B1 | 3/2002 | Li |
| 6,075,974 A | 6/2000 | Saints et al. | | 6,356,555 B1 | 3/2002 | Rakib |
| 6,078,572 A | 6/2000 | Tanno et al. | | 6,366,570 B1 | 4/2002 | Bhagalia |
| 6,081,536 A | 6/2000 | Gorsuch et al. | | 6,366,786 B1 | 4/2002 | Norman et al. |
| 6,088,324 A | 7/2000 | Sato | | 6,370,117 B1 | 4/2002 | Koraitim et al. |
| 6,088,335 A | 7/2000 | I et al. | | 6,373,830 B1 | 4/2002 | Ozluturk |
| 6,094,421 A | 7/2000 | Scott | | 6,373,834 B1 | 4/2002 | Lundh et al. |
| 6,094,576 A | 7/2000 | Häkkinen et al. | | 6,377,548 B1 | 4/2002 | Chuah |
| 6,097,707 A | 8/2000 | Hodzic et al. | | 6,377,809 B1 | 4/2002 | Rezaiifar et al. |
| 6,097,733 A | 8/2000 | Basu et al. | | 6,388,997 B1 | 5/2002 | Scott |
| 6,097,972 A | 8/2000 | Saints et al. | | 6,388,999 B1 | 5/2002 | Gorsuch et al. |
| 6,100,843 A | 8/2000 | Proctor, Jr. et al. | | 6,389,000 B1 | 5/2002 | Jou |
| 6,101,176 A | 8/2000 | Honkasalo et al. | | 6,396,804 B2 | 5/2002 | Odenwalder |
| 6,101,179 A | 8/2000 | Soliman | | 6,396,823 B1 | 5/2002 | Park et al. |
| 6,104,708 A | 8/2000 | Bergamo | | 6,414,947 B1 | 7/2002 | Legg et al. |
| 6,111,863 A | 8/2000 | Rostoker et al. | | 6,418,148 B1 | 7/2002 | Kumar et al. |
| 6,112,092 A | 8/2000 | Benveniste | | 6,424,645 B1 | 7/2002 | Kawabata et al. |
| 6,115,370 A | 9/2000 | Struhsaker et al. | | 6,426,960 B2 | 7/2002 | Antonio |
| 6,118,767 A | 9/2000 | Shen et al. | | 6,452,911 B1 | 9/2002 | Seo |
| 6,125,148 A | 9/2000 | Frodigh et al. | | 6,452,913 B1 | 9/2002 | Proctor, Jr. |
| 6,134,233 A | 10/2000 | Kay | | 6,453,176 B1 | 9/2002 | Lopes et al. |
| 6,151,332 A | 11/2000 | Gorsuch et al. | | 6,456,608 B1 | 9/2002 | Lomp |
| 6,157,616 A | 12/2000 | Whitehead | | 6,466,800 B1 | 10/2002 | Sydon et al. |
| 6,157,619 A | 12/2000 | Ozluturk et al. | | 6,469,991 B1 | 10/2002 | Chuah |
| 6,161,013 A | 12/2000 | Anderson et al. | | 6,473,623 B1 | 10/2002 | Benveniste |
| 6,163,707 A | 12/2000 | Miller | | 6,483,816 B2 | 11/2002 | Tsunehara et al. |

| | | |
|---|---|---|
| 6,490,461 B1 | 12/2002 | Muller |
| 6,498,785 B1 | 12/2002 | Derryberry et al. |
| 6,498,790 B1 | 12/2002 | Shaheen et al. |
| 6,498,939 B1 | 12/2002 | Thomas |
| 6,501,787 B1 | 12/2002 | Odenwalder et al. |
| 6,504,830 B1 | 1/2003 | Östberg et al. |
| 6,512,751 B1 | 1/2003 | Struhsaker et al. |
| 6,512,931 B1 | 1/2003 | Park et al. |
| 6,519,452 B1 | 2/2003 | Agostino et al. |
| 6,519,651 B1 | 2/2003 | Dillon |
| 6,522,639 B1 | 2/2003 | Kitade et al. |
| 6,526,039 B1 | 2/2003 | Dahlman et al. |
| 6,526,064 B1 | 2/2003 | Bousquet |
| 6,526,281 B1 | 2/2003 | Gorsuch et al. |
| 6,532,226 B1 | 3/2003 | Lehtinent et al. |
| 6,532,365 B1 | 3/2003 | Anderson et al. |
| 6,535,545 B1 | 3/2003 | Ben-Bassat et al. |
| 6,542,481 B2 | 4/2003 | Foore et al. |
| 6,545,986 B1 | 4/2003 | Stellakis |
| 6,545,994 B2 | 4/2003 | Nelson et al. |
| 6,546,252 B1 | 4/2003 | Jetzek et al. |
| 6,563,808 B1 | 5/2003 | Cox et al. |
| 6,567,389 B1 | 5/2003 | Honkasalo et al. |
| 6,567,391 B1 | 5/2003 | Moon |
| 6,567,416 B1 | 5/2003 | Chuah |
| 6,567,670 B1 | 5/2003 | Petersson |
| 6,570,865 B2 | 5/2003 | Masui et al. |
| 6,571,296 B1 | 5/2003 | Dillon |
| 6,574,211 B2 | 6/2003 | Padovani et al. |
| 6,587,446 B2 | 7/2003 | Sarkar et al. |
| 6,597,913 B2 | 7/2003 | Natarajan |
| 6,611,231 B2 | 8/2003 | Crilly et al. |
| 6,611,514 B1 | 8/2003 | Moulsley |
| 6,621,807 B1 | 9/2003 | Jung et al. |
| 6,621,808 B1 | 9/2003 | Sadri |
| 6,621,809 B1 | 9/2003 | Lee et al. |
| 6,628,945 B1 | 9/2003 | Koorapaty et al. |
| 6,633,554 B1 | 10/2003 | Dalal |
| 6,647,000 B1 | 11/2003 | Persson et al. |
| 6,674,739 B1 | 1/2004 | Lee et al. |
| 6,687,509 B2 | 2/2004 | Schmutz et al. |
| 6,690,652 B1 | 2/2004 | Sadri |
| 6,690,938 B1 | 2/2004 | Chin |
| 6,697,642 B1 | 2/2004 | Thomas |
| 6,707,804 B2 | 3/2004 | Proctor |
| 6,707,806 B1 | 3/2004 | Kato |
| 6,717,916 B1 | 4/2004 | Ahn et al. |
| 6,718,180 B1 | 4/2004 | Lundh et al. |
| 6,724,740 B1 | 4/2004 | Choi et al. |
| 6,724,743 B1 | 4/2004 | Pigeonnat |
| 6,731,954 B1 | 5/2004 | Katz |
| 6,735,188 B1 | 5/2004 | Becker et al. |
| 6,760,596 B1 | 7/2004 | Fiorini et al. |
| 6,768,727 B1 | 7/2004 | Sourour et al. |
| 6,775,558 B1 | 8/2004 | Ranta et al. |
| 6,782,277 B1 | 8/2004 | Chen et al. |
| 6,785,247 B1 | 8/2004 | Lee |
| 6,788,661 B1 | 9/2004 | Ylitalo et al. |
| 6,795,416 B1 | 9/2004 | Han et al. |
| 6,804,219 B2 | 10/2004 | Koo et al. |
| 6,807,221 B1 | 10/2004 | Kim et al. |
| 6,826,169 B1 | 11/2004 | Nagatani et al. |
| 6,831,910 B1 | 12/2004 | Moon et al. |
| 6,845,089 B1 | 1/2005 | Gu et al. |
| 6,868,075 B1 | 3/2005 | Narvinger et al. |
| 6,925,057 B2 | 8/2005 | Cheng et al. |
| 6,925,068 B1 | 8/2005 | Stanwood et al. |
| 6,931,252 B1 | 8/2005 | Aroudaki |
| 6,934,319 B2 | 8/2005 | Subramanian |
| 6,940,845 B2 | 9/2005 | Benveniste |
| 6,954,444 B2 | 10/2005 | Ji et al. |
| 6,956,840 B1 | 10/2005 | Proctor, Jr. |
| 6,963,540 B2 | 11/2005 | Choi et al. |
| 6,977,910 B1 | 12/2005 | Hosur et al. |
| 6,999,425 B2 | 2/2006 | Cheng et al. |
| 6,999,471 B1 | 2/2006 | Frazer et al. |
| 7,027,420 B2 | 4/2006 | Hamalainen |
| 7,039,029 B2 | 5/2006 | Lee et al. |
| 7,046,717 B2 | 5/2006 | Kanterakis et al. |
| 7,079,507 B2 | 7/2006 | Toskala et al. |
| 7,079,523 B2 | 7/2006 | Nelson et al. |
| 7,092,372 B1 | 8/2006 | Jensen et al. |
| 7,099,629 B1 | 8/2006 | Bender |
| 7,136,377 B1 | 11/2006 | Tweedly et al. |
| 7,158,504 B2 | 1/2007 | Kadaba et al. |
| 7,218,623 B1 | 5/2007 | Proctor |
| 7,221,664 B2 | 5/2007 | Proctor |
| 7,224,683 B1 | 5/2007 | Marque-Pucheu et al. |
| 7,236,467 B2 | 6/2007 | Kono |
| 7,266,107 B2 | 9/2007 | Choi et al. |
| 7,340,256 B2 | 3/2008 | Speight |
| 2001/0030990 A1 | 10/2001 | Rouphael et al. |
| 2001/0033558 A1 | 10/2001 | Matsuki |
| 2001/0036200 A1 | 11/2001 | Nelson et al. |
| 2001/0038674 A1 | 11/2001 | Trans |
| 2001/0039191 A1 | 11/2001 | Maierhofer |
| 2002/0009061 A1 | 1/2002 | Willenegger |
| 2002/0045441 A1 | 4/2002 | Ralston et al. |
| 2002/0012332 A1 | 5/2002 | Tiedmann et al. |
| 2002/0080024 A1 | 6/2002 | Nelson et al. |
| 2002/0097700 A1 | 7/2002 | Alastalo |
| 2002/0141478 A1 | 10/2002 | Ozluturk et al. |
| 2003/0060224 A1 | 3/2003 | Nelson et al. |
| 2003/0095517 A1* | 5/2003 | Proctor, Jr. .................. 370/332 |
| 2003/0123401 A1 | 7/2003 | Dean |
| 2004/0005078 A1 | 1/2004 | Tillotson |
| 2004/0009785 A1 | 1/2004 | Nelson et al. |
| 2004/0047326 A1 | 3/2004 | Proctor et al. |
| 2004/0047328 A1 | 3/2004 | Proctor et al. |
| 2004/0073803 A1 | 4/2004 | Keramane |
| 2004/0160910 A1 | 8/2004 | Gorsuch et al. |
| 2004/0180696 A1 | 9/2004 | Foore et al. |
| 2004/0252668 A1* | 12/2004 | Ozukturk et al. ............. 370/335 |
| 2005/0202823 A1 | 9/2005 | Shaheen et al. |
| 2005/0208961 A1 | 9/2005 | Willenegger |
| 2008/0225766 A1 | 9/2008 | Roy et al. |

FOREIGN PATENT DOCUMENTS

| | | |
|---|---|---|
| EP | 0 443 061 | 8/1991 |
| EP | 0 526 106 | 2/1993 |
| EP | 0526106 | 2/1993 |
| EP | 0635949 | 1/1995 |
| EP | 0 682 423 | 11/1995 |
| EP | 0 682 426 | 11/1995 |
| EP | 0682423 | 11/1995 |
| EP | 0 719 062 | 6/1996 |
| EP | 0719062 | 6/1996 |
| EP | 0 720 309 | 7/1996 |
| EP | 07020309 | 7/1996 |
| EP | 0 475 698 | 3/1997 |
| EP | 0 760 564 | 3/1997 |
| EP | 0475698 | 3/1997 |
| EP | 0 773 636 | 5/1997 |
| EP | 0443061 | 8/1997 |
| EP | 0 808 074 | 11/1997 |
| EP | 0 907 262 | 4/1999 |
| EP | 0 910 176 | 4/1999 |
| EP | 0 959 581 | 11/1999 |
| EP | 1 018 809 | 12/2000 |
| EP | 1 102 512 | 5/2001 |
| FR | 2761557 | 10/1998 |
| GB | 2 326 524 | 12/1998 |
| GB | 2326524 | 12/1998 |
| JP | 59-050603 | 3/1984 |
| JP | 02-177643 | 7/1990 |
| JP | 02177643 | 7/1990 |
| JP | 03-049324 | 3/1991 |
| JP | 04-284033 | 10/1992 |
| JP | 05-030006 | 2/1993 |
| JP | 07-067164 | 3/1995 |
| JP | 07-095151 | 4/1995 |
| JP | 07095151 | 4/1995 |
| JP | 07-131398 | 5/1995 |
| JP | 07-264098 | 10/1995 |
| JP | 08-065273 | 3/1996 |
| JP | 08-242482 | 9/1996 |
| JP | 09-023203 | 1/1997 |
| JP | 09-046270 | 2/1997 |

| | | |
|---|---|---|
| JP | 09-055693 | 2/1997 |
| JP | H09-055693 | 2/1997 |
| JP | 2000-013867 | 1/2000 |
| JP | 2000-188597 | 7/2000 |
| TW | 566045 | 12/2003 |
| TW | 200536325 | 11/2005 |
| WO | 93/15573 | 8/1993 |
| WO | 95/08900 | 3/1995 |
| WO | 96/08934 | 3/1996 |
| WO | 96/19050 | 6/1996 |
| WO | 96/37081 | 11/1996 |
| WO | 96/27994 | 12/1996 |
| WO | 97/46041 | 4/1997 |
| WO | 97/23073 | 6/1997 |
| WO | 97/26726 | 7/1997 |
| WO | 97/32412 | 9/1997 |
| WO | 97/46044 | 12/1997 |
| WO | 98/09455 | 3/1998 |
| WO | 99/14869 | 3/1999 |
| WO | 99/25125 | 5/1999 |
| WO | 99/31811 | 6/1999 |
| WO | 99/52306 | 10/1999 |
| WO | 99/63382 | 12/1999 |
| WO | 99/63682 | 12/1999 |
| WO | 00/72464 | 11/2000 |

OTHER PUBLICATIONS

Bell Labs Technical Journal, Lucent Technologies, vol. 2, No. 3, Summer 1997.
Budka et al., Cellular Digital Packet Data Networks, Bell Labs Technical Journal, Summer 1997, pp. 164-181.
Cellular Digital Packet Data, System Specification, Release 1.1, Jan. 19, 1995.
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wireless Systems, Nov. 18, 1996, pp. 235-241.
Chih-Lin I et al., Multi-Code CDMA Wireless Personal Communications Networks, Jun. 18, 1995.
Chih-Lin I et al., Performance of multi-Code CDMA Wireless Personal Communications Networks, Jul. 25, 1995.
Chih-Lin I et al., Variable Spreading Gain CDMA with Adaptive Control for True Packet Switching Wireless Network, 1995, pp. 725-730.
Chung, Packet Synchronization and Identification for Incremental Redundancy Transmission in FH-CDMA Systems, 1992, IEEE, pp. 292-295.
Data Service Options for Wideband Spread Spectrum Systems: Introduction, PN-3676.1 (to be published as TIA/EIA/IS-707.1), Mar. 20, 1997 (Content Revision 1).
Data Standard, Packet Data Section, PN-3676.5 (to be published as TIA/EIA/IS-DATA.5), Dec. 8, 1996, Version 02 (Content Revision 03).
Draft Test for "95C" Physical Layer (Revision 4), Part 1, Document #531-981-20814-95C, part 1 on 3GGP2 website (ftp://ftp.3gpp2.org/tsgs/workinq/1998/1298_Maui/WG3-TG1/531-98120814-95c,%20part%201.pdf).
Draft Test for "95C" Physical Layer (Revision 4), Part 2, Document #531-981-20814-95C, part 2 on 3GGP2 website (ftp://ftp.3gpp2.org/tsgs/working/1998/1298_Maui/WG3-TG1/531-98120814-95c,%20part%201.pdf, 1998).
Ejzak et al., Lucent Technologies Air Interface Proposal for CDMA High Speed Data Service, Revision 0.1, May 5, 1997.
Ejzak et al., Lucent Technologies Air Interface Proposal for CDMA High Speed Data Service, Apr. 14, 1997.
Elhakeem, Congestion Control in Signaling Free Hybrid ATM/CDMA Satellite Network, IEEE, 1995, pp. 783-787.
Hall et al., Design and Analysis of Turbo Codes on Rayleigh fading Channels, IEEE Journal on Selected Areas in Communications, vol. 16, No. 2, Feb. 1998, pp. 160-174.
High Data Rate (HDR) Solution, Qualcomm, Dec. 1998.
High Data Rate (HDR), cdmaOne optimized for high speed, high capacity data, Wireless Infrastructure, Qualcomm, Sep. 1998.
Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II pp. 649-653.
Kaiser et al., Multi-Carrier CDMA with Iterative Decoding and Soft-Interference Cancellation, Proceedings of Globecom 1997, vol. 1, pp. 523-529.
Knisely, Lucent Technologies Air Interface Proposal for CDMA High Speed Data Service, Jan. 16, 1997.
Krzymien et al., Rapid Acquisition Algorithms for synchronization of Bursty Transmissions in CDMA Microcellular and Personal Wireless Systems, IEEE Journal on Selected Areas in Communications, vol. 14, No. 3, Apr. 1996, pp. 570-579.
Kumar et al., An Access Scheme for High Speed Packet Data Service on IS-95 based CDMA, Feb. 11, 1997.
Lau et al., A Channel-State-Dependent Bandwidth Allocation scheme for Integrated Isochronous and Bursty Media Data in a Cellular Mobile Information System, IEEE, 2000, pp. 524-528.
Liu et al., Channel Access and Interference Issues in Multi-Code DS-CDMA Wireless Packet (ATM) Networks, Wireless Networks 2, pp. 173-196, 1996.
Lucent Technologies Presentation First Slide Titled, Summary of Multi-Channel Signaling Protocol, Apr. 6, 1997.
Lucent Technologies Presentation First Slide titled, Why Support Symmetric HSD (Phase 1C), Feb. 21, 1997.
Melanchuk et al., CDPD and Emerging Digital Cellular Systems, Digest of Papers of COMPCON, Computer Society Conference 1996, Santa Clara, CA, No. CONF. 41, Feb. 25, 1996, pp. 2-8 XP000628458.
Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.
Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.
Network Wireless Systems Offer Business Unit (NEW OBU), Feature Definition Document for Code Division Multiple Access (CDMA) Packet Mode Data Services, FDD-1444, Nov. 26, 1996.
Packet Data Service Option Standard for Wideband Spread Spectrum Systems, TIA/EIA Interim Standard, TIA/EIA/IS-657, Jul. 1996.
Puleston, PPP Protocol Spoofing Control Protocol, Global Village Communication (UK) Ltd., Feb. 1996.
Reed et al., Iterative Multiuser Detection for CDMA with FEC: Near-Single-User Performance, IEEE Transactions on Communications, vol. 46, No. 12, Dec. 1998, pp. 1693-1699.
Shacham et al., A Selective-Repeat-ARQ Protocol for Parallel Channels and its Resequencing Analysis, IEEE Transactions on Communications, XP000297814, pp. 773-782, Apr. 1992.
Skinner et al., Performance of Reverse-Link Packet Transmission in Mobile Cellular CDMA Networks, IEEE, 2001, pp. 1019-1023.
TIA/EIA Interim Standard, Mobile Station-Base Station Compatibility Standard for Dual-Mode Wideband Spread Spectrum Cellular System, TIA/EIA/IS-95 (Jul. 1993).
Tsui, J.B. and Shaw, R., Sensitivity of EW Receivers, Microwave Journal, vol. 25, Nov. 1982, pp. 115-117, 120.
Viterbi, The Path to Next Generation Services with CDMA, Qualcomm Incorporated, 1998 CDMA Americas Congress, Los Angeles, California, Nov. 19, 1998.
Wang et al., The Performance of Turbo-Codes in Asynchronous DS-CDMA, IEEE, Global Communications Conference, Phoenix, Arizona, USA, Nov. 3-8, 1997, Gol. III, pp. 1548-1551.
Attachment 2, *High Speed Data RLP* Lucent Technologies, Version 0.1, Jan. 16, 1997.
Chelouah, A., et al., "Angular Diversity Based on Beam Switching of Circular Arrays for Hiperlan Terminals," *Electronics Letters*, vol. 36, No. 5, pp. 387-388, (Mar. 2, 2000).
*Data Service Options for Wideband Spread Spectrum Systems*. TIA/EIA Interim Standard. TIA/EIA/IS-707-A. Apr. 1999.
*Data Services Option Standard for Wideband Spread Spectrum Digital Cellular System*. TIA/EIA/IS-99. TIA/EIA Interim Standard. Jul. 1995.

*Data Services Options Standard for Wideband Spread Spectrum Systems: Packet Data Services.* PN-3676.5 (to be published as TIA/EIA/IS-707.5) Ballot Version, May 30, 1997.

Draft Text for "★95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf).

Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).

Durnan, G.J., et al. "Optimization of Microwave Parabolic Antenna Systems Using Switched Parasitic Feed Structures," URSI National Science Meeting, Boulder, CO, p. 323, (Jan. 4-8, 2000).

Durnan, G.J., et al., "Switched Parasitic Feeds for Parabolic Antenna Angle Diversity," *Microwave and Optical Tech. Letters*, vol. 23, No. 4, pp. 200-2003(Nov. 20, 1999).

Ejzak, et al. *Proposal for High Speed Packet Data Service, Version 0.1.* Lucent Technologies, Jan. 16, 1997.

Giger, A.J., *Low-Angle Microwave Propagation: Physics and Modeling*, Norwood, MA, Artech House, (1991).

Hall et al., Design and Analysis of Turbo Codes on Rayleigh Fading Channels, IEEE Journal on Selected Areas in Communications, vol. 16, No. 2, Feb. 1998, pp. 160-174.

Harrington, R.F., "Reactively Controlled Antenna Arrays," *IEEE Aps International Symposium Digest*, Amherst, MA , pp. 62-65, (Oct. 1976).

Harrington, R.F., "Reactively Controlled Directive Arrays," *IEEE Trans. Antennas and Propagation*, vol. AP-26, No. 3, pp. 390-395, (May 1978).

Heine, Gunnar, "The Air-Interface of GSM", in GSM Networks: Protocols, Terminology, and Implementation, (MA: Artech House, Inc.), pp. 89-100 (1999).

Honkasalo, Harri. *High Speed Data Air Interface.* 1996.

*Introduction to cdma2000 Spread Spectrum Systems, Release C.* TIA/EIA Interim Standard. TIA/EIA/IS- 2000.1-C. May, 2002.

James , J.R. et al., "Electrically Short Monopole Antennas with Dielectric or Ferrite Coatings," Proc. IEEE, vol. 125, pp. 793-803, (Sep. 1978).

James, J.R., et al., "Reduction of Antenna Dimensions with Dielectric Loading," *Electronics Letters*, vol. 10, No. 13, pp. 263-265, (May 1974).

King, R.W.P., "The Many Faces of the Insulated Antenna," Proc. IEEE, vol. 64, No. 2, pp. 228-238, (Feb. 1976).

Kingsley, S.P., et al., "Beam Steering and Monopulse Processing of Probe-Fed Dielectric Resonator Antennas," *IEEE Proc.-Radar, Sonar, Navigation*, vol. 146, No. 3, pp. 121-125, (Jun. 1999).

Knight, P., "Low-Frequency Behavior of the Beverage Aerial," *Electronics Letter*, vol. 13, No. 1, pp. 21-22, (Jan. 1977).

Knisely, Douglas, N. Telecommunications Industry Association Subcommittee TR-45.5—*Wideband Spread Spectrum Digital Technologies Standards.* Banff, Alberta. Feb. 24, 1997 (TR45.5/97.02.24)21.

Knisely, Douglas, N. Telecommunications Industry Association Subcommittee TR-45.5-Wideband Spread Spectrum Digital Technologies Standards, Working Group III-Physical Layer. Banff, Alberta. Feb. 24, 1997 (TR45.5/97.02.24)22.

Kumar et al, An Access Scheme for High Speed Packet Data Service on IS-95 based CDMA, Feb. 11, 1997.

Lau et al, A Channel-State-Dependent Bandwidth Allocation scheme for Integrated Isochronous and Bursty Media Data in a Cellular Mobile Information System, IEEE, 2000, pp. 524-528.

Long, S.A., et al., "The Resonant Cylindrical Dielectric Cavity Antenna," *IEEE Trans. Antennas and Propagation*, vol. AP-31, No. 3, pp. 406-412, (May 1983).

Lu, J., et al., "Multi-beam Switched Parasitic Antenna Embedded in Dielectric for Wireless Communications Systems," *Electronics Letters*, vol. 37, No. 14, pp. 871-872, (Jul. 5, 2001).

Lucent Technologies Presentation First Slide Titled, Why Support Symmetric HSD (Phase 1C), Feb. 21, 1997.

Luzwick, J., et al., "A Reactively Loaded Aperture Antenna Array," *IEEE Trans. Antennas and Propagation*, vol. AP-26, No. 4, pp. 543-547, (Jul. 1978).

McCallister, M.W. et al., "Resonant Hemispherical Dielectric Antenna," *Electronics Letters*, vol. 20, No. 16, pp. 657-659, (Aug. 1984).

McCallister, M.W., et al., "Rectangular Dielectric Resonator Antenna," *Electronics Letter*, vol. 19, No. 6, pp. 218-219, (Mar. 1983).

Melanchuk et al. *CDPD and Emerging Digital Cellular Systems*, Digest of Papers of COMPCN, Computer Society Conference 1996, Santa Clara, CA, No. CONF. 41, Feb. 25, 1996, pp. 2-8, XP000628458.

Milne, R.M.T., "A Small Adaptive Array Antenna for Mobile Communications," *IEEE APS International Symposium Digest*, pp. 797-800, (1985).

Motorola, Version 1.0. *Motorola High Speed Data Air Interface Proposal Comparisions and Recommendations.* Jan. 27, 1997.

*MSC-BS Interface (A-Interface) for Public 800 MHz.* TIA/EIA/IS-634-A. TIA/EIA Interim Standard (Revision of TIA/EIA/IS-634) Jul. 1998.

*MSC-BS Interface for Public 800 MHz.*TIA/EIA/IS-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Ovesjö Frederik, European Telecommunication Standard, SMG2 UMTS physical Layer Expert Group, "UTRA Physical Layer Descriptions FDD parts" (v0.4, Jun. 25, 1998), pp. 1-41, XP-002141421.

*Physical Layer Standard for cdma2000 Spread Spectrum Systems, Release C.* TIA/EIA Interim Standard. TIA/EIA/IS-2000.2C. May 2002.

Preston, S., et al., "Direction Finding Using a Switched Parasitic Antenna Array," *IEEE APS International Symposium Digest*, Montreal, Canada, pp. 1024-1027, (1997).

Preston, S.L., et al., A Multibeam Antenna Using Switched Parasitic and Switched Active Elements for Space-Division Multiple Access Applications, *IEICE Trans. Electron.*, vol. E82-C, No. 7, pp. 1202-1210, (Jul. 1999).

Preston, S.L., et al., "Base-Station Tracking in Mobile Communications using a Switched Parasitic Antenna Array," *IEEE Trans. Antennas and Propagation*, vol. 46, No. 6, pp. 841-844, (Jun. 1998).

Preston, S.L., et al., "Electronic Beam Steering Using Switched Parasitic Patch Elements," *Electronics Letters*, vol. 33, No. 1, pp. 7-8, (Jan. 2, 1997).

Preston, S.L., et al., "Size Reduction of Switched Parasitic Directional Antennas Using Genetic Algorithm Optimization Techniques," *Asia Pacific Microwave Conference Proceedings*, Yokohama, Japan, pp. 1401-1404, (1998).

Preston, S.L., et al, "Systematic Approach to the Design of Directional Antennas Using Switched Parasitic and Switched Active Elements," *Asia Pacific Microwave Conference Proceedings*, Yokohama, Japan, pp. 531-534, (1998).

Ruze, J., "Lateral-Feed Displacement in a Paraboloid," *IEEE Trans. Antennas and Propagation*, vol. 13, pp. 660-665, (1965).

Scott, N.L., et al., "Diversity Gain from a Single-Port Adaptive Antenna Using Switched Parasitic Elements Illustrated with a Wire and Monopole Prototype," *IEEE Trans. Antennas and Propagation*, vol. 47, No. 6, pp. 1066-1070, (Jun. 1999).

Shacham, et al., "A Selective-Repeat-ARQ Protocol for Parallel Channels and Its Resequencing Analysis," IEEE Transactions on Communications, XP000297814, 40 (4): 773-782 (Apr. 1997).

Sibille, A., et al., "Circular Switched Monopole Arrays for beam Steering Wireless Communications," *Electronics Letters*, vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1-17. http://www.faqs.org/rfcs/rfc1662.html.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems*. TSB74, Dec. 1995. TIA/EIA Telecommunications Systems Bulletin.
*Telecommunications Industry Association Meeting Summary.* Task Group I, Working Group III, Subcommittee TR45.5. Feb. 24-27, 1997. Banff, Alberta.
*Telecommunications Industry Association Meeting Summary.* Task Group I, Working Group III, Subcommittee TR45.5. Jan. 6-8, 1997. Newport Beach, California.
Third Generation Partnership Project, "Technical Specification Group Radio Access Network; MAC protocol specification (Release 4)," 3GPP TS 25.321 V4.0.0 (Mar. 2001).
Third Generation Partnership Project, "Technical Specification Group Radio Access Network; MAC protocol specification (Release 4)," 3GPP TS 25.321 V4.4.0 (Mar. 2002).
Third Generation Partnership Project, "Technical Specification Group Radio Access Network; MAC protocol specification (Release 5)," 3GPP TS 25.321 V5.0.0 (Mar. 2002).
Third Generation Partnership Project, "Technical Specification Group Radio Access Network; Physical channels and mapping of transport channels onto physical channels (FDD) (Release 5)," 3GPP TS 25.211 V5.0.0 (Mar. 2002).
Third Generation Partnership Project, "Technical Specification Group Radio Access Network; Physical channels and mapping of transport channels onto physical channels (FDD) (Release 4)," 3GPP TS 25.211 V4.4.0 (Mar. 2002).
Third Generation Partnership Project, "Technical Specification Group Radio Access Network; Physical channels and mapping of transport channels onto physical channels (FDD) (Release 4)," 3GPP TS 25.211 V4.0.0 (Mar. 2001).
Third Generation Partnership Project, "Technical Specification Group Radio Access Networks; Requirements for Support of Radio Resource Management (FDD) (Release 4)," 3GPP TS 25.133 V4.4.0 (Mar. 2002).
Third Generation Partnership Project, "Technical Specification Group Radio Access Networks; Requirements for Support of Radio Resource Management (FDD) (Release 4)," 3GPP TS 25.133 V4.0.0 (Mar. 2001).
Third Generation Partnership Project, "Technical Specification Group Radio Access Networks; Requirements for Support of Radio Resource Management (FDD) (Release 5)," 3GPP TS 25.133 V5.2.0 (Mar. 2002).
Third Generation Partnership Project, "Technical Specification Group Radio Access Network; RRC Protocol Specification (Release 4)," 3GPP TS.25.331 V4.0.0 (Mar. 2001).
Third Generation Partnership Project, "Technical Specification Group Radio Access Network; RRC Protocol Specification (Release 4)," 3GPP TS 25.331 V4.4.0 (Mar. 2002).
Third Generation Partnership Project, "Technical Specification Group Radio Access Network; RRC Protocol Specification (Release 5)," 3GPP TS 25.331 V5.0.0 (Mar. 2002).
Third Generation Partnership Project, "Technical Specification Group Radio Access Network; UE Procedures in Idle Mode and Procedures for Cell Reselection in Connected Mode (Release 4)," 3GPP TS 25.304 V4.0.0 (Mar. 2001).
Third Generation Partnership Project, "Technical Specification Group Radio Access Network; UE Procedures in Idle Mode and Procedures for Cell Reselection in Connected Mode (Release 4)," 3GPP TS 25.304 V4.4.0 (Mar. 2002).
Third Generation Partnership Project, "Technical Specification Group Radio Access Network; UE Procedures in Idle Mode and Procedures for Cell Reselection in Connected Mode (Release 5)," 3GPP TS 25.304 V5.0.0 (Mar. 2002).
Tsui et al., "Sensitivity of EW Receivers," Microwave Journal, vol. 25, pp. 115-117, 120 (Nov. 1982).
*Upper Layer (Layer 3) Signaling Standard for cdma2000 Spread Spectrum Systems, Release C.* TIA/EIA Interim Standard. TIA/EIA/IS-2000.5-C. May 2002.
Vaughn, R., "Switched Parasitic Elements for Antenna Diversity," *IEEE Trans. Antennas and Propagation*, vol. 47, No. 2, pp. 399-405, (Feb. 1999).
WWW.CDG.ORG/NEWS/PRESS/1997.ASP.__CDA_Press_Release__Archive.__1997.

Yang, Samuel C., "Principles of Code Division Multiple Access," in CDMA RF System Engineering, (MA: Artech House, Inc.), 1998, Chapter 4, pp. 75-103.
Lee et al., "A Novel Hybrid CDMA/TDMA Protocol with a Reservation Request Slot for Wireless ATM Networks," IEICE Transactions on Communications, vol. E82-B, No. 7, pp. 1073-1076 (Jul. 25, 1999). X**.
Liu et al., Channel Access and Interference Issues in Multi-Code DS-CDMA Wireless Packet (ATM) Networks,.
Third Generation Partnership Project 2, "cdma2000 High Rate Packet Data Air Interference Specification," 3GPP2 C.S0024 Version 2.0 (Oct. 27, 2000).
Third Generation Partnership Project 2, "Physical Layer Standard for cdma2000 Spread Spectrum Systems," 3GPP2 C.0002-0 Version 1.0 (Jul. 1999).
Third Generation Partnership Project, "Technical Specification Group Radio Access Network; Physical Layer Procedures (FDD) (Release 1999)." 3GPP TS 25.214 v3.1.0 (Dec. 1999).
Third Generation Partnership Project, "Technical Specification Group Radio Access Network; Physical Layer Procedures (FDD) (Release 1999)." 3GPP TS 25.214 v3.5.0 (Dec. 2000).
Third Generation Partnership Project, "Technical Specification Group Radio Access Network; Physical layer procedures (TDD) (Release 1999)," 3GPP TS 25.224 V3.1.0 (Dec. 1999).
Third Generation Partnership Project, "Technical Specification Group Radio Access Network; Physical layer procedures (TDD) (Release 1999)," 3GPP TS 25.224 V3.5.0 (Dec. 2000).
Third Generation Partnership Project, "Technical Specification Group Radio Access Network; Spreading and modulation (TDD) (Release 1999)," 3GPP TS 25.223 V3.1.0 (Dec. 1999).
Third Generation Partnership Project, "Technical Specification Group Radio Access Network; Spreading and modulation (TDD) (Release 1999)," 3GPP TS 25.223 V3.4.0 (Sep. 2000).
Third Generation Partnership Project, "Technical Specification Group Radio Access Network; Radio Resource Management Strategies (3G TR 25.922 version 3.0.0)," 3G TR 25.922 V3.0.0 (Dec. 1999).
Third Generation Partnership Project, "Technical Specification Group Radio Access Network; Radio Resource Management Strategies (Release 1999)," 3G TR 25.922 V3.4.0 (Dec. 2000).
Third Generation Partnership Project, "Technical Specification Group Radio Access Network; MAC protocol specification (3G TS 25.321 version 3.2.0)," 3G TS 25.321 V3.2.0 (Dec. 1999).
Third Generation Partnership Project, "Technical Specification Group Radio Access Network; MAC protocol specification (Release 1999)," 3G TS 25.321 V3.6.0 (Dec. 2000).
Third Generation Partnership Project, "Technical Specification Group Radio Access Network; Services provided by the physical layer (Release 1999)," 3GPP TS 25.302 V3.7.0 (Dec. 2000).
Third Generation Partnership Project, "Technical Specification Group Radio Access Network; Services provided by the physical layer (Release 1999)," 3GPP TS 25.302 V3.2.0 (Dec. 1999).
Third Generation Partnership Project, "Technical Specification Group Radio Access Network; Physical channels and mapping of transport channels onto physical channels (TDD) (3G TS 25.221 version 3.1.0)," 3G TS 25.221 V3.1.0 (Dec. 1999).
Third Generation Partnership Project, "Technical Specification Group Radio Access Network; Physical channels and mapping of transport channels onto physical channels (TDD) (Release 1999)," 3G TS 25.221 V3.5.0 (Dec. 2000).
Third Generation Partnership Project, "Technical Specification Group Radio Access Network; RRC Protocol Specification (3G TS 25.331 version 3.1.0 Release 1999)," 3G TS 25.331 V3.1.0 (Jan. 2000).
Third Generation Partnership Project, "Technical Specification Group Radio Access Network; RRC Protocol Specification (Release 1999)," 3GPP TS 25.331 V3.5.0 (Dec. 2000).
Third Generation Partnership Project, "Technical Specification Group Radio Access Network, Synchronisation in UTRAN Stage 2 (Release 1999)," 3GPP TS 25.402 V3.4.0 (Dec. 2000).

Third Generation Partnership Project, "Technical Specification Group Radio Access Network, Synchronisation in UTRAN Stage 2 (3G TS 25.402 version 3.0.0 Release 1999)," 3GPP TS 25.402 V3.4.0 (Dec. 2000).

Third Generation Partnership Project, "Technical Specification Group Radio Access Network; Physical Layer Procedures (FDD) (Release 1999)." 3GPP TS 25.214 v3.10.0 (Mar. 2002).

Third Generation Partnership Project, "Technical Specification Group Radio Access Network; Physical layer procedures (TDD) (Release 1999)," 3GPP TS 25.224 V3.10.0 (Mar. 2002).

Third Generation Partnership Project, "Technical Specification Group Radio Access Network; Spreading and modulation (TDD) (Release 1999)," 3GPP TS 25.223 V3.8.0 (Mar. 2002).

Third Generation Partnership Project, "Technical Specification Group Radio Access Network; Radio Resource Management Strategies (Release 1999)," 3G TR 25.922 V3.7.0 (Mar. 2002).

Third Generation Partnership Project, "Technical Specification Group Radio Access Network; MAC protocol specification (3G TS 25.321 version 3.2.0)," 3G TS 25.321 V3.11.0 (Mar. 2002).

Third Generation Partnership Project, "Technical Specification Group Radio Access Network; Services provided by the physical layer (Release 1999)," 3GPP TS 25.302 V3.12.0 (Mar. 2002).

Third Generation Partnership Project, "Technical Specification Group Radio Access Network; Physical channels and mapping of transport channels onto physical channels (TDD) (Release 1999)," 3G TS 25.221 V3.10.0 (Mar. 2002).

Third Generation Partnership Project, "Technical Specification Group Radio Access Network; RRC Protocol Specification (Release 1999)," 3GPP TS 25.331 V3.10.0 (Mar. 2002).

Third Generation Partnership Project, "Technical Specification Group Radio Access Network, Synchronisation in UTRAN Stage 2 (Release 1999)," 3GPP TS 25.402 V3.9.0 (Mar. 2002).

Third Generation Partnership Project, "Technical Specification Group Radio Access Network; Physical channels and mapping of transport channels onto physical channels (FDD) (Release 1999)," 3GPP TS 25.211 V3.6.0 (Mar. 2001).

Third Generation Partnership Project, "Technical Specification Group Radio Access Network; Physical channels and mapping of transport channels onto physical channels (FDD) (Release 1999)," 3GPP TS 25.211 V3.9.0 (Dec. 2001).

Third Generation Partnership Project, "Technical Specification Group Radio Access Networks; UE Radio Transmission and Reception (FDD) (Release 1999)," 3GPP TS 25.101 V3.6.0 (Mar. 2001).

Third Generation Partnership Project, "Technical Specification Group Radio Access Networks; UE Radio Transmission and Reception (FDD) (Release 1999)," 3GPP TS 25.101 V3.10.0 (Mar. 2002).

Third Generation Partnership Project, "Technical Specification Group Radio Access Network; Physical layer—General description (Release 1999)," 3GPP TS 25.201 V3.3.0 (Mar. 2002).

Third Generation Partnership Project, "Technical Specification Group Radio Access Network; Physical layer—General description (Release 1999)," 3GPP TS 25.201 V3.1.0 (Jun. 2000).

Third Generation Partnership Project, "3rd Generation Partnership Project (3GPP); Technical Specification Group (TSG) RAN WG4; Requirements for Support of Radio Resource Management (FDD)," 3G TS 25.133 V3.0.0 (Dec. 1999).

Third Generation Partnership Project, "Technical Specification Group Radio Access Network; UE Procedures in Idle Mode and Procedures for Cell Reselection in Connected Mode (3G TS 25.304 version 3.1.0)," 3G TS 25.304 V3.1.0 (Dec. 1999).

Third Generation Partnership Project, "Technical Specification Group Radio Access Network; UE Procedures in Idle Mode and Procedures for Cell Reselection in Connected Mode (Release 1999)," 3G TS 25.304 V3.5.0 (Dec. 2000).

Third Generation Partnership Project, "Technical Specification Group Radio Access Network; UE Procedures in Idle Mode and Procedures for Cell Reselection in Connected Mode (Release 1999)," 3GPP TS 25.304 V3.10.0 (Mar. 2002).

Third Generation Partnership Project, "Technical Specification Group Radio Access Networks; Requirements for Support of Radio Resource Management (FDD) (Release 1999)," 3GPP TS 25.133 V3.3.0 (Sep. 2000).

Third Generation Partnership Project, "Technical Specification Group Radio Access Network; Requirements for support of radio resource management (FDD) (Release 1999)," 3GPP TS 25.133 V3.9.0 (Mar. 2002).

Third Generation Partnership Project, "Technical Specification Group Radio Access Network; Physical channels and mapping of transport channels onto physical channels (FDD) (3G TS 25.211 version 3.1.0)," 3G TS 25.211 V3.1.0 (Dec. 1999).

Third Generation Partnership Project, "Technical Specification Group Radio Access Network; Physical channels and mapping of transport channels onto physical channels (FDD) (Release 1999)," 3GPP TS 25.211 V3.5.0 (Dec. 2000).

Third Generation Partnership Project, "Technical Specification Group Radio Access Network; Physical channels and mapping of transport channels onto physical channels (FDD) (Release 1999)," 3GPP TS 25.211 V3.10.0 (Mar. 2002).

Third Generation Partnership Project, "Technical Specification Group Group Radio Access Network; Multiplexing and channel coding (FDD) (3G TS 25.212 version 3.1.0)," 3G TS 25.212 V3.1.0 (Dec. 1999).

Third Generation Partnership Project, "Technical Specification Group Radio Access Network; Multiplexing and channel coding (FDD) (Release 1999)," 3GPP TS 25.212 V3.9.0 (Mar. 2002).

Third Generation Partnership Project, "Technical Specification Group Radio Access Network; Multiplexing and channel coding (FDD) (Release 1999)," 3GPP TS 25.212 V3.5.0 (Dec. 2000).

Third Generation Partnership Project, "Technical Specification Group (TSG) RAN WG4 UE Radio transmission and Reception (FDD)," TS 25.101 V3.1.0 (Dec. 1999).

Third Generation Partnership Project, "Technical Specification Group Radio Access Networks; UE Radio Transmission and Reception (FDD) (Release 1999)," 3GPP TS 25.101 V3.4.1 (Nov. 2000).

Third Generation Partnership Project, "Technical Specification Group Radio Access Network; Physical layer—General description (3G TS 25.201 version 3.0.0)," 3G TS 25.201 V3.0.0 (Oct. 1999).

Third Generation Partnership Project, "Technical Specification Group Radio Access Network; Physical layer—General description (Release 1999)," 3G TS 25.201 V3.1.0 (Jun. 2000).

* cited by examiner

TRANSMITTAL OF HEARTBEAT SIGNAL AT A LOWER LEVEL THAN HEARTBEAT REQUEST

CROSS REFERENCE TO RELATED APPLICATIONS

This application is a continuation of U.S. patent application Ser. No. 10/171,080, filed Jun. 12, 2002, now a U.S. Pat. No. 7,221,664, which issued on May 22, 2007, which claims the benefit of U.S. Provisional Patent Application Ser. Nos. 60/378,697, filed May 7, 2002, and U.S. Provisional Patent Application Ser. No. 60/297,925, filed Jun. 13, 2001.

U.S. patent application Ser. No. 10/171,080 is also a continuation-in-part of U.S. patent application Ser. No. 09/775,305, filed Feb. 1, 2001, now U.S. Pat. No. 7,079,523, which issued Jul. 18, 2006, which claims the benefit of U.S. Provisional Patent Application Ser. No. 60/180,598, filed Feb. 7, 2000.

U.S. Patent Application Ser. No. 10/171,080 is also a continuation-in-part of U.S. patent application Ser. No. 09/997,621, filed Nov. 29, 2001, now U.S. Pat. No. 6,678,260, issued Jan. 13, 2004, which is a continuation of U.S. patent application Ser. No. 09/730,376, filed Dec. 5, 2000, now U.S. Pat. No. 6,707,804, issued Mar. 16, 2004, which is a continuation of U.S. patent application Ser. No. 09/088,413, filed Jun. 1, 1998, now U.S. Pat. No. 6,222,832, issued Apr. 24, 2001, wherein each of the aforementioned applications are incorporated by reference as if fully set forth.

BACKGROUND

Increasing use of wireless telephones and personal computers has led to a corresponding increase in demand for advanced telecommunication services that were once thought practical only for specialized applications. In the 1980s, wireless voice communications became widely available through cellular telephone networks. Such services were thought at first to be for the exclusive province of businessmen because of expected high subscriber costs. The same was also true for access to remotely distributed computer networks, whereby until very recently, only business people and large institutions could afford the necessary computers and wireline access equipment.

As a result of the widespread availability of affordable new technologies, the general population now increasingly desires to have not only wireline access to networks such as the Internet and private intranets, but also wireless access as well. Wireless technology is particularly useful to users of portable computers, laptop computers, hand-held personal digital assistants and the like who prefer access to such networks without being tethered to a telephone line.

There still is no widely available satisfactory solution for providing low cost, high speed access to the Internet, private intranets, and other networks using the existing wireless infrastructure. This is most likely an artifact of several unfortunate circumstances. First, the typical manner of providing high speed data service in the business environment over a wireline network is not readily adaptable to the voice grade service available in most homes or offices. For example, such standard high speed data services do not necessarily lend themselves to efficient transmission over standard cellular wireless handsets because wireless networks were originally designed only to provide voice services. As a result, present day digital wireless communications systems are optimized for voice transmissions, although certain schemes such as CDMA do provide some measure of asymmetrical behavior for the accommodation of data transmissions. For example, the data rate specified by the Telecommunication Industry Association (TIA) for IS-95 on the forward traffic channel is adjustable in increments from 1.2 kbps up to 9.6 kbps for so-called Rate Set 1, and increments from 1.8 kbps up to 14.4 kbps for Rate Set 2. On the reverse link traffic channel, however, the data rate is fixed at 4.8 kbps.

At best, existing wireless systems therefore typically provide a radio channel that can accommodate maximum data rate transfers of 14.4 kilobits per second (kbps) over a forward link direction. Such a low data rate channel does not lend itself directly to transmitting data at rates of 28.8 or even 56.6 kbps that are now commonly available using inexpensive wireline modems, not to mention even higher rates such as the 128 kbps that are available with Integrated Services Digital Network (ISDN) type equipment. Data rates at these levels are rapidly becoming the minimum acceptable rates for activities such as browsing web pages.

Although wireline networks were known at the time when cellular systems were initially developed, for the most part, there was no provision made for such wireless systems to provide higher speed ISDN- or ADSL-grade data services over cellular network topologies.

In most wireless systems, there are many more potential users than radio channel resources. Some type of demand-based multiple access system is therefore required.

Whether the multiple access is provided by the traditional Frequency Division Multiple Access (FDMA) using analog modulation on a group of radio frequency carrier signals, or by schemes that permit sharing of a radio carrier frequency using Time Division Multiple Access (TDMA), or Code Division Multiple Access (CDMA), the nature of the radio spectrum is such that it is expected to be shared. This is quite dissimilar to the traditional environment supporting data transmissions in which the wireline medium is relatively inexpensive and is not typically intended to be shared.

Other factors to consider in the design of a wireless system are the characteristics of the data itself. For example, consider that access to web pages generally is burst-oriented, with asymmetrical data rate transmission requirements in a reverse and forward direction. In a common application, a user of a remote client computer first specifies the address of a web page to a browser program. The browser program then sends the web page address data, which is usually 100 bytes or less in length, over the network to a server computer. The server computer then responds with the content of the requested web page, which may include anywhere from 10 kilobytes to several megabytes of text, image, audio, or even video data. The user thereafter may spend several seconds or even several minutes reading the content of the page before downloading another web page.

In an office environment, the nature of most employees' computer work habits is typically to check a few web pages and then to do something else for an extended period of time, such as accessing locally stored data or even terminating use of the computer altogether. Therefore, even though such users may remain connected to the Internet or private intranet continuously during an entire day, actual use of the high speed data link is usually quite sporadic.

If wireless data transfer services supporting Internet connectivity are to coexist with wireless voice communication, it is becoming increasingly important to optimize the use of available resources in wireless CDMA systems. Frequency re-use and dynamic traffic channel allocation address some aspects of increasing the efficiency of high performance wireless CDMA communication systems, but there is still a need for more efficient utilization of available resources.

SUMMARY OF THE INVENTION

In one application, a transmission of a marker in a time slot over one channel indicates a request by the corresponding field unit to go active. That is, transmission of a marker in an assigned time slot indicates that the field unit is requesting that reverse link traffic channels be assigned to the user for transmitting a data payload from the field unit to the base station. This presumes that the field unit is presently in the standby mode. Alternatively, a field unit transmits a marker over a second channel of the pair of reverse link channels to indicate that the field unit is not requesting to be placed in the active mode. For example, the field unit does not want to transmit data on a reverse link channel. Rather, the field unit requests to remain inactive but synchronized with the base station so that the field unit can immediately go active again at any moment.

In either case, a wireless communications system employing the principles of the present invention may improve performance of detecting the markers by having the field units transmit the markers at different power levels (e.g., 9 dB for one marker and 11 dB for the other marker), which can improve system performance. The difference in power levels of the markers allows the base station to identify the request markers using alternative criteria with a low probability of error, where the alternative criteria may include comparing the markers to respective energy level thresholds, monitoring occupancy of time slots, occupancy of mutually exclusive code channels, or combinations thereof. For example, in one particular embodiment, a request marker, which is generally a high priority marker, is transmitted with higher power, which improves the probability of detection and reduces the probability of false detection of the request marker.

In one particular CDMA system application, the field unit provides a Heartbeat (HB) channel using a first code in a reverse link to the base station and a heartbeat-with-request (HB/RQST) channel using a second code in the reverse link. In this CDMA application, according to the principles of the present invention, the field unit may transmit the HB and HB/RQST channels with a difference in power levels, preferably giving the HB/RQST the higher power since it is a higher priority signal.

The teachings of the present invention support I-CDMA and 1×EV-DV systems, but are general enough to support systems employing various other communications protocols used in wired or wireless communications systems. Code Division Multiple Access (CDMA) systems, such as IS-2000, and Orthogonal Frequency Division Multiplexing (OFDM) systems, such as IEEE 802.11a wireless local area network (LAN), may employ an embodiment of the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
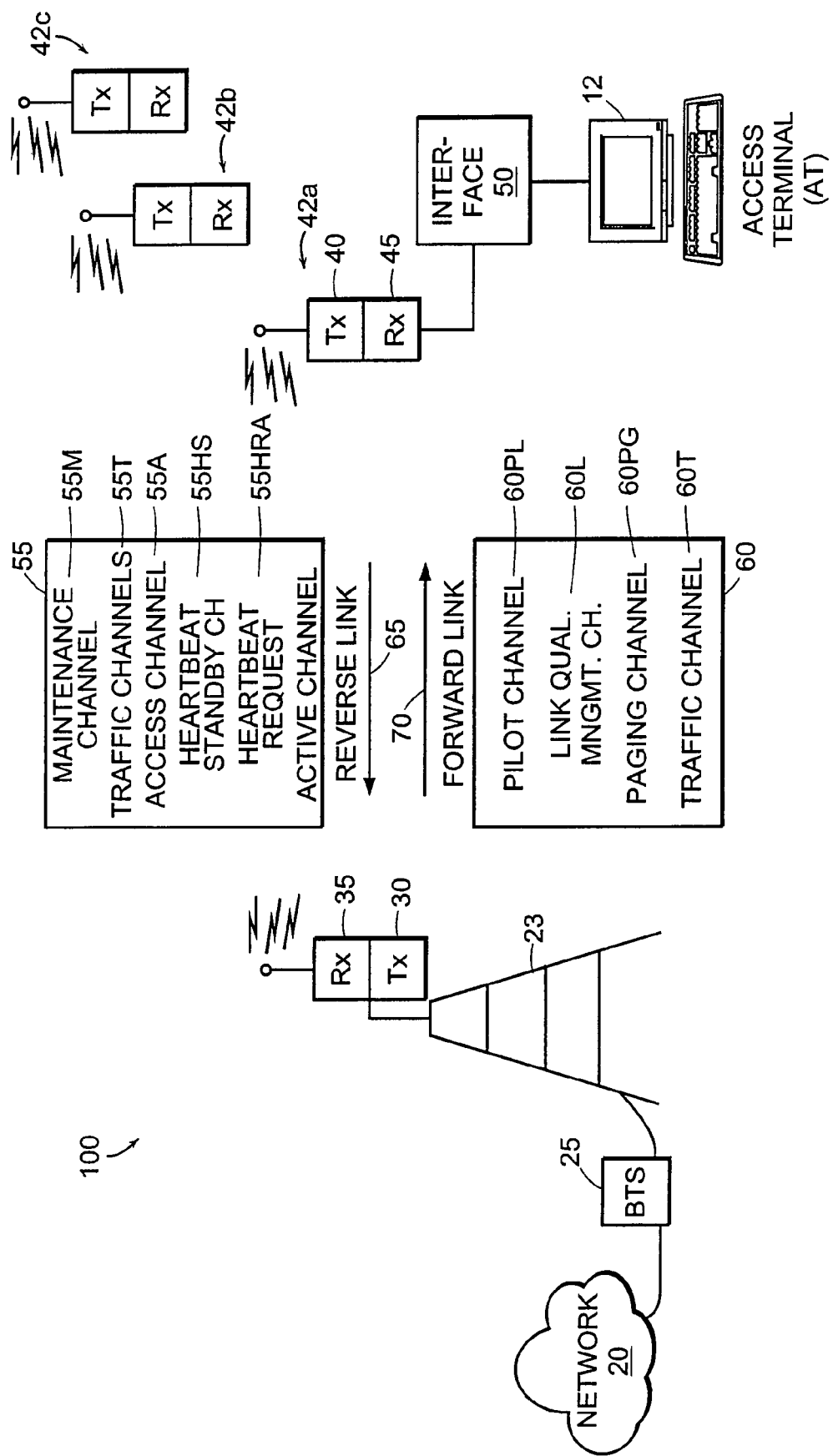
FIG. 1 is a schematic diagram of a communications system in which an embodiment of the present invention may be deployed.

A description of the preferred embodiments of the invention follows.

In a wireless communications system, an embodiment of the present invention applies to the power that is transmitted from a handset (or the target received power at a base terminal station (BTS)) for a Heartbeat signal (HB) versus a Heartbeat-with-Request signal (HBR, HB/RQST, or just the "request" signal). The HB and HB/RQST signals may be transmitted on a maintenance channel, which, as disclosed in U.S. Ser. No. 09/775,305, is a single code channel (out of many) on a reverse link of a CDMA communications system. The maintenance channel is time slotted and different users are assigned different slots.

A field unit in that wireless communications system sends a heartbeat signal to maintain timing and/or power control as well as an indication of presence to the BTS. When a terminal needs an assigned reverse link channel, the terminal then transmits at least one request signal. The signal(s) may be modulated messages or simply coded pilot signals with no "bits".

The requirements for probability of detection and probability of false detection for these channels are quite different. For instance, the detection requirement for HB is relatively low. It may only need to be detected at a rate that is fast enough to track the slew of the timing of the code channel due to physical movement of multi-path structure change resulting from Doppler in the channel. The power control in this case continues to work independent of detection or lack of detection.

For instance, if the signal is not "detected" because the received power is not above a predetermined threshold but the correlation is aligned, the power command indicates that the power was too low and that the terminal should "power up". One requirement, in this particular embodiment, is that the detection occur often enough to allow the detector to be aligned in time to the received signal.

On the other hand, the probability of detection for the request signal is preferably very high as a request signal is considered a high priority signal since a request is an urgent event. Therefore, the request signal may be sent with higher power, and the threshold at the BTS may be set differently. This results in a better probability of detection as well as a low probability of false detection.

Thus, according to the principles of the present invention, a different probability of detection and probability of false detection for the heartbeat signal, request signal, or any other signaled message can be employed.

Based on the signal type, an access terminal can transmit the signals with different powers. Various criteria can be used by the BTS for detecting indications of a request sent on the signals. For example, in time slotted channels or mutually exclusive code channels, some slots are occupied when a request is being made versus when a request is not being made. In such a case, either a higher power, presence, or both may be used as detection criteria.

FIG. 1 is a diagram of an example communications system 100, similar to the system described above, employing an embodiment of the present invention. A base station 25 with antenna tower 23 maintains wireless communications links with each of a plurality of field units 42a, 42b, 42c (collectively, field units 42) as shown. Such wireless links are established based upon assignment of resources on a forward link 70 and a reverse link 65 between the base station 25 and field units 42. Each link 65 or 70 is typically made up of several logical reverse link channels 55 and several logical forward link channels 60, respectively.

As shown, the communications system 100 supports wireless communications between an interface 50 and a network 20. Typically, the network 20 is a Public Switched Telephone Network (PSTN) or computer network, such as the Internet, internet, or intranet. The interface 50 is preferably coupled to a digital processing device, such as a portable computer 12, sometimes referred to as an access unit, to provide wireless access to the network 20. Consequently, the portable computer 12 has access to the network 20 based on communications over a combination of both hard-wired and wireless data links.

In a preferred embodiment, the forward link channels 60 and reverse link channels 55 are defined in the communications system 100 as Code Division Multiple Access (CDMA) channels. That is, each CDMA channel is preferably defined by encoding and transmitting data over the channel with an augmented pseudo random noise (PN) code sequence. The PN coded data is then modulated onto a radio frequency carrier. This enables a receiver to decipher one CDMA channel from another knowing only the particular augmented PN code assigned for a given channel. In accordance with an embodiment, each channel may occupy a 1.25 MHZ band consistent with the IS-95 CDMA standard and 1×EV-DV standard and is capable of transmitting at 38.4 kbps.

A forward link 70 includes at least four logical forward link channels 60. As shown, this includes a Pilot Channel 60PL, Link Quality Management (LQM) channel 60L, paging channel 60PG, and multiple traffic channels 60T.

A reverse link 65 includes at least five logical reverse link channels 55. As shown, this includes a heartbeat standby channel 55HS, heartbeat request active channel 55HRA, access channel 55A and multiple traffic channels 55T. Generally, the reverse link channels 55 are similar to the forward link channels 60 except that each reverse link traffic channel 60T can support variable data rates from 2.4 kbps to a maximum of 160 kbps.

Data transmitted between the base station 25 and field unit 42a typically consist of encoded digital information, such as web page data. Based on the allocation of multiple traffic channels in the reverse link 65 or forward link 70, higher data transfer rates can be achieved in a particular link between the base station 25 and field unit 42a. However, since multiple field units 42 compete for bandwidth allocation, a field unit 42a may have to wait until resources are free to be assigned traffic channels to transmit a data payload.

Before discussing an example detector system (FIG. 2) that can be used to distinguish a heartbeat from a heartbeat-with-request signal, a brief discussion of example signals will be discussed in reference to FIGS. 3A-3C.

Figure 3A:
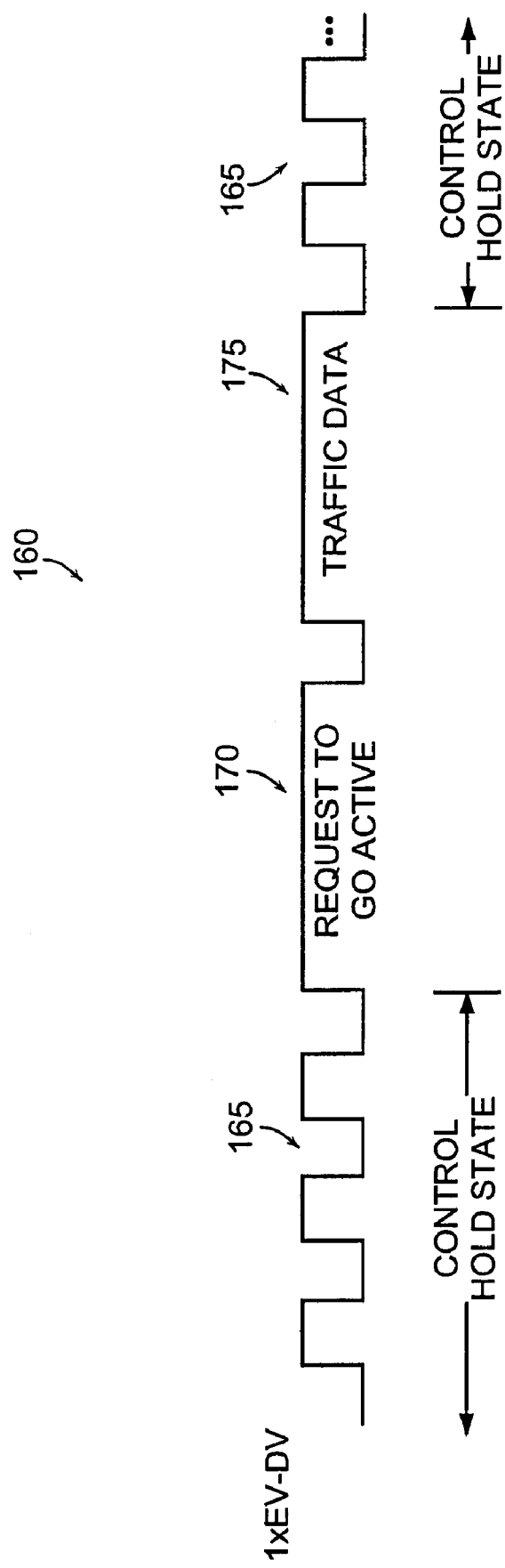
FIG. 3A is a signal diagram of a 1×EV-DV signal with a first marker indicating 'control hold' and a second marker indicating a 'request to go active'.

In FIG. 3A, a 1×EV-DV signal 160 that may be transmitted by the field unit is shown having three distinct states: a 'control hold' state 165, a 'request to go active' state 170, and a data traffic state 175. In the 'control hold' state 165, the signal 160 does not include a 'request to go active' indication. In other words, the signal 160 remains in an 'idle' or 'control hold' state, which indicates that the field unit 42a is not requesting traffic channels. The 'request to go active' state 170 is an indication that the field unit is requesting to transmit data on a traffic channel over a reverse link to the BTS 25. In the traffic state 175, traffic data is transmitted by the field unit to the BTS. Following transmission of the traffic data over the reverse link, the signal 160 reverts back to the 'control hold' state 165 following a transmission of a 'data transmission complete' state (not shown).

Although shown as a single signal 160, it should be understood that the signal may be multiple signals, optionally coded with orthogonal or non-orthogonal codes into mutually exclusive channels. For example, the 'control hold' state 165 may be transmitted on a different channel from the 'request to go active' state 170. Similarly, the traffic data transmitted in a traffic state 175 may be on a separate channel from the other two states 165, 170. An example of multiple channel is discussed in reference to FIGS. 3B and 3C.

Figure 3B:
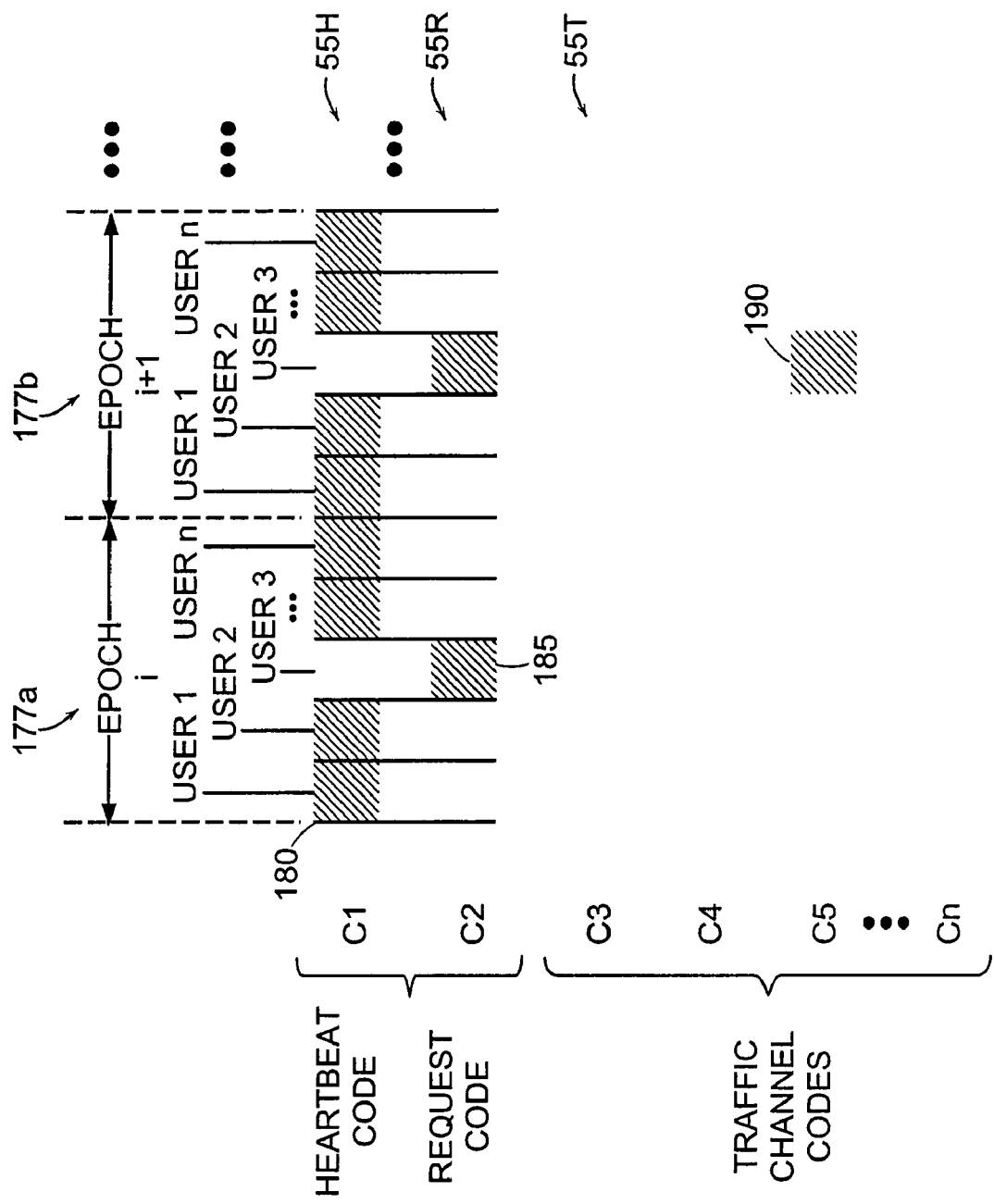
FIG. 3B is a signal diagram of a code division multiple access (CDMA) set of code channels having a marker in an assigned time slot that indicates that the field unit is requesting a change in communications states.

FIG. 3B is an example of an Internet code division multiple access (I-CDMA) signaling diagram that has assigned time slots for users 1, 2, 3, . . . , N repeating in epoch i 177a, epoch i+1 177b, and so forth. The channels are composed of the heartbeat channel 55H, request channel 55R, and traffic channels 55T. Each of these channels has an associated code C1, C2, C3, C4, . . . , CN, which allow signals to be transmitted on mutually exclusive code channels. Both the transmitting and receiving systems process the information in the channels by using the codes to separate the information respectively included therein in a typical CDMA manner.

In the example shown, users 1, 2, 4, 5, 6, . . . , N are requesting to remain in an idle state, indicated by the presence of a signal 180 in the heartbeat channel 55H. User 3, however, is requesting to transmit data over a reverse link based on a signal 185 in the request channel 55R in the first epoch 177a. In the second epoch 177b, user 3 begins to transmit traffic data 190 in an associated traffic channel using code C5.

Figure 3C:
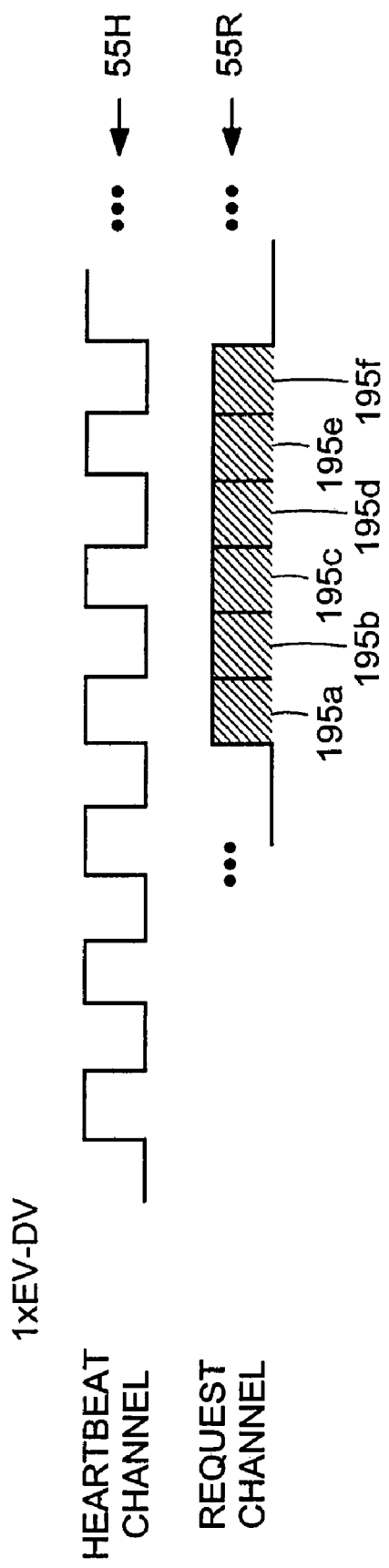
FIG. 3C is a signal diagram of an alternative embodiment of a reverse link signal having the indications.

FIG. 3C is a more detailed signal diagram of the 1×EV-DV signal of FIG. 3A that is used to indicate a 'request to go active' to the base station 25 from the field unit 42a. In this embodiment, the 1×EV-DV signal is composed of multiple signals on different logical channels: a heartbeat channel 55H and a request channel 55R. The heartbeat channel 55H provides continuous timing and other information (e.g., power level, synchronization, etc.) from the field unit 42a to the base station 25. The field unit 42a uses the request channel 55R to make a request (e.g., digital "1") of the base station 25 to request a traffic channel on the reverse link 65 for transmitting data.

Sampling time periods 195a, 195b, . . . , 195f (collectively 195) denoted by arrows indicate times or intervals at which the BTS 25 samples the time slots of the request signal 55R and, optionally, the heartbeat channel 55H to determine whether a request for a traffic channel is being made. It should be understood that the sampling may occur over the entire time slot or a subset thereof. Also, the heartbeat channel 55H and request channel 55R use mutually exclusive codes, in this particular embodiment, so the sampling is performed on their mutually exclusive code channels 55H, 55R in all or a subset of time slots. In one particular embodiment, the base station 25 samples mutually exclusive code channels 55H, 55R in time slots designated for request indications, such as in time slots at sampling times 195b, 195d, and 195f. During these time slots, the heartbeat channel 55H is "inactive," but the request channel 55R is "active".

As discussed above, the signals in the "active" request time slots may be modulated messages or simply coded pilot signals with no "bits". Thus, detection may be based solely on the respective energy levels of the heartbeat and heartbeat-with-request signals in respective time slots over a given time interval or spanning several time intervals. In one particular embodiment, the 'control hold' state 165 indication has a first energy level, and the 'request to go active' state 170 has a second energy level.

In this particular embodiment, distinguishing the two states may be a matter of measuring energy levels of the signals(s) and (i) comparing the energy levels against at least one threshold or (ii) determining that a request is present, optionally in a mutually exclusive code channel in time slots when the heartbeat signal is at a logical zero. The different energy levels of the indications may be provided by the duty cycle of the signals, frequency of the signals, power of the signals, signaling structure, and so forth.

Figure 4:
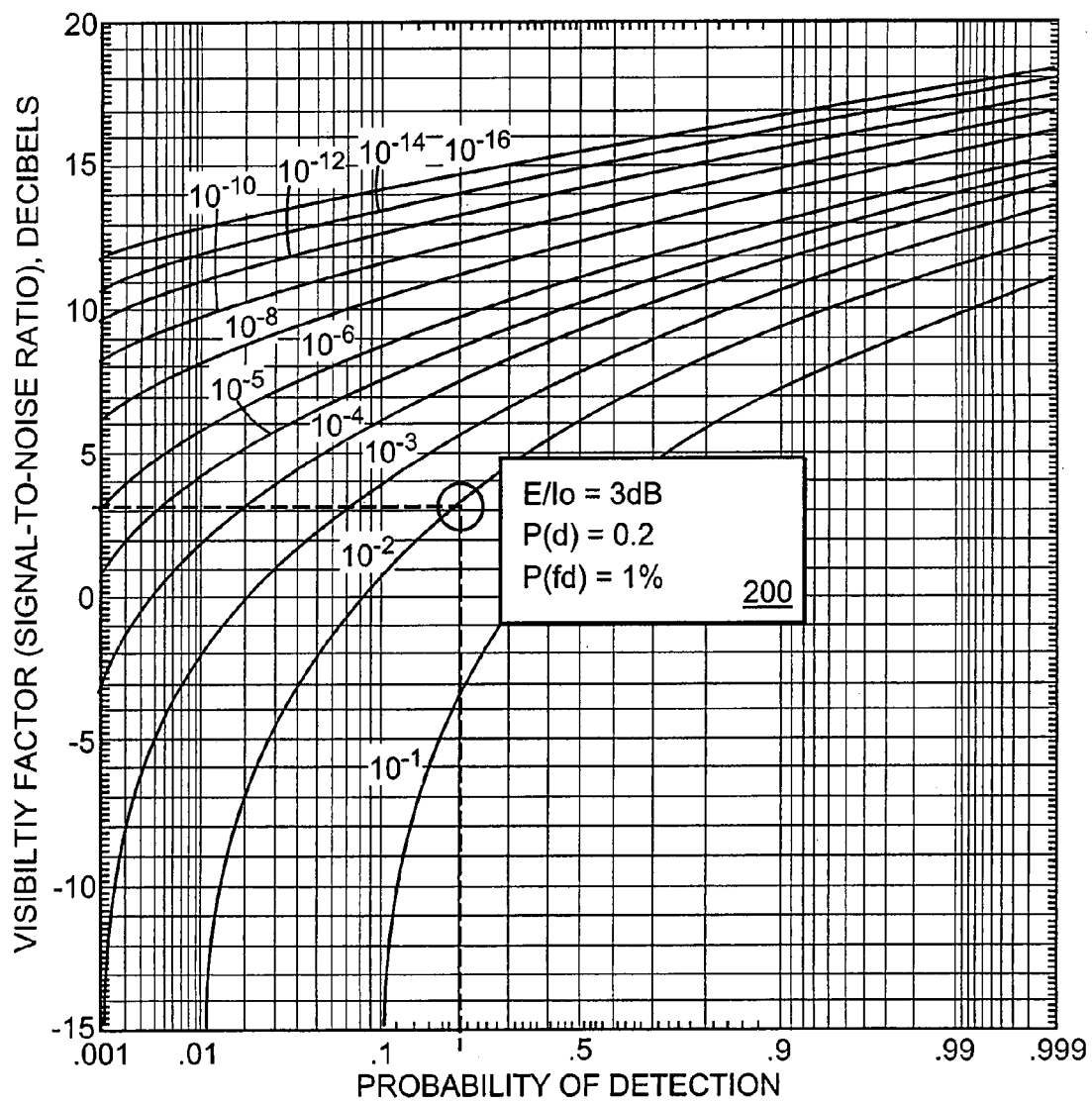
FIG. 4 is a plot of signal-to-noise ratio versus probability of detection that may be used in determining energy levels of the indications in the signals of FIGS. 3A-3C.

To understand how the energy levels of the signals can be used to improve system performance, one can refer to FIG. 4, which provides a chart for selecting signaling requirements based on the following parameters or factors: (i) probability of detection, P(d)(x-axis), (ii) signal-to-noise ratio in decibels (y-axis), and (iii) probability of false detection, P(fd) (curves in the chart). This chart shows a required signal-to-noise ratio at the input terminals of a linear-rectifier detector as a function of probability of detection for a single pulse, with the false-alarm probability P(fd) as a parameter, calculated for a non fluctuating signal. It should be understood that alternative parameters or factors may be used to establish or define the transmitted power levels of the indications.

At the circled point 200, the signal-to-noise ratio is 3 dB, P(d)=20%, and P(fd)=1%. To increase the probability of detection for the same probability of false detection, one simply needs to slide the circled point 200 upward along the same probability of false detection curve, which suggests that an increase in the signal-to-noise ratio is used to improve system performance and, thus, improving the likelihood that the request signal will be detected quickly.

Before providing an example model and discussion regarding example Heartbeat standby 55HS and Heartbeat Request Active 55HRA energy levels for the example communications system 100 (FIG. 1), a brief discussion of a processor and detector that may be used in the system is now provided.

Figure 2:
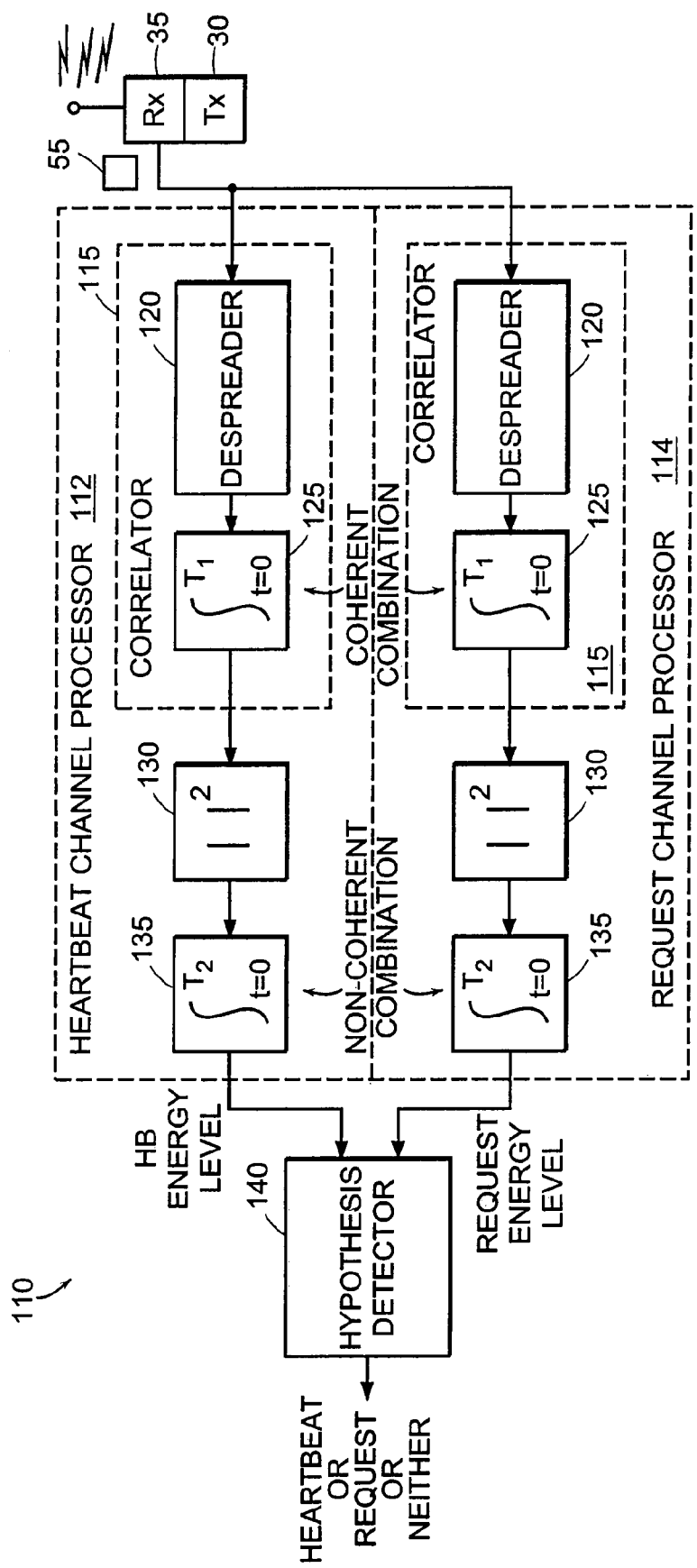
FIG. 2 is a schematic diagram of a subsystem employed by a base station in the communications system of FIG. 1 used to determine whether a reverse link signal includes an indication for a request to change communications states based on an energy level in the signal.

FIG. 2 is a schematic diagram of a request detection processor 110 used to determine whether the field unit 42a has requested to send data to the BTS 25. The receiver Rx 35 receives signals 55, which includes the maintenance channel 55N, traffic channels 55T, access channel 55A, heartbeat standby channel 55HS, and heartbeat request active channel 55HRA. The reverse link channels 55 are processed such that a heartbeat channel processor 112 receives the heartbeat standby channel 55HS and a request channel processor 114 receives the Heartbeat Request Active channel 55HRA.

The heartbeat channel processor 112 and request channel processor 114 include the same processing elements, in this particular embodiment, so a discussion of just the heartbeat channel processor 112 will be provided for brevity.

The heartbeat channel processor 112 receives the heartbeat standby channel 55HS. A correlator 115 uses a despreader 120 to despread the heartbeat standby channel 55HS. An integrator 125 is used to coherently combine the heartbeat signal. By coherently combining the signal, an integration of I, Q and its phase causes the phase of the signal to be removed and output the power of the signal.

Following the correlator 115, a rectifier 130 (i.e., absolute value of the signal squared) rectifies the power of the signal, which is then integrated by a second integrator 135 to calculate the energy of the received heartbeat signal. The second integrator 135 provides non-coherent combination of the signal, which is calculated over short time intervals. The non-coherent integration provides just magnitudes if the terminal is moving too fast, thus causing a cross-over of the 180-degree phase point, which can cause ambiguities in determining the energy of the signal in the absence of the non-coherent combination.

The output from the heartbeat channel processor 112 is a heartbeat energy level, and the output from the request channel processor 114 is a request energy level. Each of these energy levels, in this particular embodiment, is fed to a hypothesis detector 140, which determines whether a heartbeat signal, request signal, or neither signal is in the reverse link channels 55 received by the base station 25.

To determine which signal(s) is/are present, the hypothesis detector 140 includes logical functions. For example, in this particular embodiment, the hypothesis detector 140 compares a first energy level threshold against the first energy level (i.e., heartbeat energy level) and compares a second energy level threshold against the second energy level (i.e., request energy level).

An example energy level threshold to compare the heartbeat energy level against is 9 dB and the request energy level threshold is 11 dB. The energy level thresholds may be dynamically selected, predetermined, or applied in another manner, such as based on a transmitted power level, which may be reported by the field unit to the base station over the heartbeat channel 55H, for instance. In the case of the energy level calculation and comparison, the first and second energy levels may be dependent on occupancy of time slots in the signaling channel(s) used by the signal 55, so the energy level thresholds can be based on an expected or specified number of "1" bits used to indicate a 'request to go active' or to indicate a request to remain in idle mode.

The output of the hypothesis detector 140 may be used to change the state of the communications system. For example, if the hypothesis detector 140 determines that a 'request to go active' (i.e., send a data transmission on the reverse link) is being made by the field unit, then the hypothesis detector outputs a signal to a processor (not shown in the BTS 25) that is responsible for providing the portable computer 12 with a traffic channel 55T. In one embodiment, the BTS 25 allocates the traffic channel 55T if the detected energy level of the signal is determined to be above the second energy level threshold. Alternatively, the BTS allocates the traffic channel 55T if the hypothesis detector 140 determines that the detected energy level is below the second energy level threshold.

As described in reference to FIG. 3C, the heartbeat channel processor 112, request channel processor 114, and hypothesis detector 140 may be configured or designed in a manner that monitors an occupancy of time slots used to indicate the request to change communications states. In one embodiment, the detecting includes monitoring occupancy of mutually exclusive code channels, such as shown in FIGS. 3B and 3C.

A feedback loop (not shown) may be employed to cause the heartbeat channel processor 112 and request channel processor 114 to be "adaptive". For example, based on the received energy level of the heartbeat channel 55H, the integration time of the integrators 125, 135 may be adjusted, and the energy level thresholds used by the hypothesis detector 140 for comparison of the energy levels of the heartbeat and request signals may also be adjusted by the feedback loop. Such a feedback loop may use a command or message to transfer information between the BTS and field unit that includes information regarding the power levels of the heartbeat or heartbeat-with-request signals transmitted by the field unit.

As discussed above, the first communications state may be a standby communications state and the second communications state may be a payload communications state. In other systems or even the same system, the communications states may refer to other communications states, such as a request to change base stations, power control signaling, and so forth. The use of different energy levels in signaling as described herein is applicable to wireless, wired, or optical communications systems. In either case, the communications states may be used in voice or data communications systems.

As also discussed above, the second energy level may be based on a target probability of detection, false detection, or combination of both as discussed in reference to FIG. 4. In other words, the field unit may transmit the request signal at a given power level or a given number of pulses per given time period to achieve a corresponding signal-to-noise ratio for a given target probability of detection, false detection, or both as discussed in reference to FIG. 4.

An analysis may be used to set the transmission power or number of transmitted indications, or a feedback mechanism may be employed in the communications system for causing the field unit to change its behavior so as to have the received energy levels of the indications achieve a predetermined signal-to-noise ratio, thus providing the desired probability of detection and false detection parameters.

Simulation:

A simulation is now presented that discusses the trades effecting the probabilities of detection and false detection for the heartbeat (HB) and heartbeat-with-request (HB/RQST) channels. Recommended SNR targets for HB and HB/RQST channels are provided. Further, an analytical calculation is made to determine a recommended target E/Io for an acceptable probability of detection and probability of false detection.

To allow readers to baseline the simulation relative to IS-2000 power control, the reader should be aware that the simulation employs the following parameters:

800 Hz closed loop power control;
SNR of the i'th user is calculated as SNR(i)=P(i)−P_interference+processing Gain+Er, where P_interference(i) is a total received interference for the i'th user and calculated as P interference(i)=20*log 10(10)^$\Sigma_{j \neq i}$(10^P(j)/20)+10^($P_{TH}$/20)), where P(i) is the power received from the i'th user and $P_{TH}$ is thermal noise floor and is arbitrarily set to 120 dBm;
processing gain is 10 log 64;
fading model is Jakes;
Er=a Normal distributed random variable with 1 sigma=0.67 dB error in SNR estimation at the BTS; and
power control bit (PCB) errors=3%.

In this particular simulation, a choice of a target SNR for the HB channel was chosen first. Based on a 9 dB E/Io, where E is the entire energy in the heartbeat message and a 95% probability of detection with a 0.1% false detection rate in Additive White Gaussian Noise (AWG) is achieved (see Viterbi, A., CDMA: *Principles of Spread Spectrum Communication*, Addison Wesley, 1995, p 113.)

Increasing the probability of detection to 99% yields significantly higher false detection rate of 1% in AWGN. This false detection rate is of interest as it should be low enough that non-detection will occur for a relatively long duration when the terminal has dropped the communications link with the base station.

Typically, the duration is defined by a timer having a duration of 500 ms to 2 sec or 25 to 100 sequential non-detections. For reference, in a single path fading environment with 9 db E/Io, a 90% detection probability and a 1% false detection rate is predicted by theory. For this case, the details associated with the detection probability in the fading environment are considered in the following discussion.

Detection of the heartbeat signal with 50 Hz power control versus field unit velocity is now considered. The simulation is based on a full rate model in which modifications were made such that the power control (PC) rate is 50 Hz and standby terminals are time slotted, non-overlapping.

While the speed of the terminal is irrelevant above about 2 mph, closed-loop power control is seen as useful in allowing the fading to vary around the mean path loss. It is noted that the results are relatively insensitive to a Power Control Bit (PCB) error rate up to about 40%. Beyond that, the system performed poorly, demonstrating that some form of closed-loop control is needed to maintain the mean path loss. It is therefore useful that some form of closed-loop power control be performed to bring the transmitter (Tx) power of the field unit to the average appropriate for the field unit to achieve the mean path loss to the base station.

Simulation using the above parameters shows that if the base station detects the 'request to go active' indication 2 dB below the target SNR (as defined above), then the average time of detection is about 16 ms, with standard deviation at about 14 ms. From the simulation, to achieve a low latency in HB/RQST detection, the following equation has been determined:

$$\text{Target\_SNR}(RQST) = \text{Target\_SNR}(HB) + 2 \text{ dB} \quad (1)$$

Based on the required detecting/false detection rates in AWGN, a Target_SNR of 9 dB for the Heartbeat message and 11 dB for the heartbeat-with-request (HB/RQST) message were chosen. These parameters yield a 15 ms detection latency on average at 20 mph with low probability of false detection.

In terms of false assignment probability, while the false detection rate is not explicitly calculated in the simulation, a pessimistic bound is given as follows:

$$Pfd(RQST) = (1 - Pd(HB)) * Pfd(HB) \quad (2)$$
$$= 5\% * 0.1\% = 5E - 5,$$

where Pfd is the probability of false detection and Pd is the probability of detection.

The above equation and result is a product of two conditions: (i) not detecting the existence of a HB while it is present and (ii) falsely detecting a HB when it is not present. This is a pessimistic bound since the additional 2 dB of transmitted power for HB/RQST versus HB is not included in the analysis.

At a HB rate of 50 Hz, this would yield a false assignment for one standby user every 400 seconds on average. For N heartbeat users, the probability is linear since the events are independent. Therefore, for a fully loaded standby user population of 96 for a particular base station, the average false assignment rate is expected to be roughly one every four seconds.

A condition of a false assignment can be recovered from relatively quickly as the false assignment can be detected quickly. When a false assignment occurs, three conditions are typically present. First, no traffic shows up on the assigned reverse channel. Second, the heartbeat-with-request signal is not present. If a missed channel assignment has occurred, the HB/RQST continues to be present. Third, the heartbeat message will likely be present. The probability of not detecting this condition in one frame is Pfd(RQST)=5E−3%. This should be detected within one or two frames before the channel can be re-assigned to a legitimate user. If it is assumed that detection takes two frames, the reverse capacity would be reduced by no more than 1% and is likely less as the probability of false detection for the HB/RQST is targeted at 11 dB E/Io.

For a signal with no offset between the Target_SNR and the detection threshold, the delay to detection is 35 ms on the average between the simulation with a remote subscriber unit moving at 1 mph and at 20 mph. For the heartbeat-with-request (HB/RQST) signal, the average delay to detection is less than 20 ms, with a detection threshold of 2 dB below the target SNR of 11 dB. This is possible since the transmit (Tx) power is increased by 2 dB for the HB/RQST relative to the HB signal.

The simulation shows that the minimum average, given 96 users in a 20 ms power control (PC) period is close to 10 ms. The delay is expected to be better than 75 ms 99% of the time.

The simulation also shows that the addition of 2 dB of additional transmit power for the HB/RQST message increases the detection probability and reduces the detection latency to 15 ms on average. An estimate of the co-channel total interference of a fully loaded maintenance channel is between 6 dB less than an IS-2000 fundamental channel (9600 bps Reverse Traffic Channel (R-TCH), 9600 bps Reverse Dedicated Control Channel (R-DCCH)).

While this invention has been particularly shown and described with references to preferred embodiments thereof, it will be understood by those skilled in the art that various changes in form and details may be made therein without departing from the scope of the invention encompassed by the appended claims.

What is claimed is:

1. A code division multiple access (CDMA) user device comprising:
   an antenna;
   a controller configured to control a CDMA transceiver such that a connection with a network is established; and
   the controller further configured to control the CDMA transceiver to transmit a signal of a first type including pilot information having a first orthogonal code from the CDMA user device over a reverse link, and transmit a signal of a second type having a second orthogonal code in a at least one slot from the CDMA user device over the reverse link requesting that a base station provide additional resources associated with a reverse link traffic channel, wherein the reverse link traffic channel includes a plurality of channels having respective orthogonal codes that are divided in time into intervals, wherein the intervals are subdivided into slots.

2. The CDMA user device according to claim 1 wherein the CDMA transceiver is configured to transmit the signal of the first type and the signal of the second type at different power levels.

3. The CDMA user device according to claim 1 wherein the signal of the second type indicates the request that the base station provide additional resources by using a single bit in the signal of the second type.

4. The CDMA user device according to claim 1 wherein the controller is further configured to receive information and the signal of the first type is transmitted in slots derived from the received information and not in other slots of the time interval.

5. The CDMA user device according to claim 4 wherein the signal of the first type maintains timing between the CDMA user device and the base station.

6. The CDMA user device according to claim 4 wherein the signal of the first type maintains power control between the CDMA user device and the base station.

7. The CDMA user device according to claim 1 wherein each of the plurality of channels of the reverse link traffic channel supports variable data rates.

8. A method performed by a code division multiple access (CDMA) user device comprising:
   establishing, by the CDMA user device, a connection with a network; and
   transmitting, by the CDMA user device, a signal of a first type, a second type and a reverse link traffic channel; wherein the signal of the first type includes pilot information and having a first orthogonal code, wherein the signal of the second type having a second orthogonal code in a at least one slot from the CDMA user device over the reverse link requesting that a base station provide additional resources associated with a reverse link traffic channel, wherein the reverse link traffic channel includes a plurality of channels having respective orthogonal codes that are divided in time into intervals, wherein the intervals are subdivided into slots.

9. The method according to claim 8 wherein the signal of the first type and the signal of the second type are transmitted at different power levels.

10. The method according to claim 8 wherein the signal of the second type indicates the request that the base station provide additional resources by using a single bit in the signal of the second type.

11. The method according to claim 8 further comprising receiving information; wherein the signal of the first type is transmitted in slots derived from the received information and not in other slots of the time interval.

12. The method according to claim 11 wherein the signal of the first type maintains timing between the CDMA user device and the base station.

13. The method according to claim 12 wherein the signal of the first type maintains power control between the CDMA user device and the base station.

14. The method according to claim 12 wherein each of the plurality of channels of the reverse link traffic channel supports variable data rates.

15. A code division multiple access (CDMA) base station and network comprising:
   transmit and receive components configured to establish a connection with a user device; wherein the transmit and receive components are configured to receive a signal of a first type, a second type and a reverse link traffic channel from the CDMA user device; wherein the signal of the first type includes pilot information and having a first orthogonal code, wherein the signal of the second type having a second orthogonal code over the reverse link requesting that a base station provide additional resources associated with a reverse link traffic channel and being received in at least one time slot, wherein the reverse link traffic channel includes a plurality of channels having respective orthogonal codes that are divided in time into intervals, wherein the intervals are subdivided into slots.

16. The CDMA base station and network according to claim 15 wherein the signal of the second type indicates the request that the base station provide additional resources is by using a single bit in the signal of the second type.

17. The CDMA base station and network according to claim 15 further comprising transmitting information from the CDMA base station indicating slots that the signal of the first type is to be transmitted.

18. The CDMA base station and network according to claim 17 wherein the signal of the first type maintains timing between the CDMA user device and the base station.

19. The CDMA base station and network according to claim 18 wherein the signal of the first type maintains power control between the CDMA user device and the base station.

* * * * *

UNITED STATES PATENT AND TRADEMARK OFFICE
CERTIFICATE OF CORRECTION

PATENT NO. : 8,134,980 B2  Page 1 of 1
APPLICATION NO. : 11/805013
DATED : March 13, 2012
INVENTOR(S) : James A. Proctor, Jr.

It is certified that error appears in the above-identified patent and that said Letters Patent is hereby corrected as shown below:

ON THE TITLE PAGE

At Section (63) "Related U.S. Application Data", delete text and insert:

--This application is a continuation of U.S. Patent Application Serial No. 10/171,080, filed June 12, 2002, now U.S. Patent No. 7,221,664, which issued on May 22, 2007. U.S. Patent Application Serial No. 10/171,080 is also a continuation-in-part of U.S. Patent Application Serial No. 09/775,305, filed February 1, 2001, now U.S. Patent No. 7,079,523, which issued July 18, 2006, which claims the benefit of U.S. Provisional Patent Application Serial No. 60/180,598, filed February 7, 2000. U.S. Patent Application Serial No. 10/171,080 is also a continuation-in-part of U.S. Patent Application Serial No. 09/997,621, filed November 29, 2001, now U.S. Patent No. 6,678,260, issued January 13, 2004, which is a continuation of U.S. Patent Application Serial No. 09/730,376, filed December 5, 2000, now U.S. Patent No. 6,707,804, issued March 16, 2004, which is a continuation of U.S. Patent Application Serial No. 09/088,413, filed June 1, 1998, now U.S. Patent No. 6,222,832, issued April 24, 2001.--.

Signed and Sealed this
Tenth Day of July, 2012

David J. Kappos
*Director of the United States Patent and Trademark Office*